(12) United States Patent
Pauly et al.

(10) Patent No.: US 7,587,432 B2
(45) Date of Patent: *Sep. 8, 2009

(54) METHOD FOR DATA MAINTENANCE IN A NETWORK OF PARTIALLY REPLICATED DATABASE SYSTEMS

(75) Inventors: Heinz Pauly, Ludwigshafen (DE); Rainer Brendle, Neckargemünd (DE)

(73) Assignee: SAP AG, Walldorf (DE)

( * ) Notice: Subject to any disclaimer, the term of this patent is extended or adjusted under 35 U.S.C. 154(b) by 286 days.

This patent is subject to a terminal disclaimer.

(21) Appl. No.: 11/122,015

(22) Filed: May 5, 2005

(65) Prior Publication Data

US 2005/0203946 A1 Sep. 15, 2005

Related U.S. Application Data

(63) Continuation of application No. 09/937,707, filed as application No. PCT/DE00/01552 on Mar. 13, 2000, now Pat. No. 6,910,053.

(30) Foreign Application Priority Data

Jun. 18, 1999 (DE) ................................ 199 28 035
Oct. 14, 1999 (EP) ................................ 99120009

(51) Int. Cl.
*G06F 17/30* (2006.01)
(52) U.S. Cl. .............................. 707/203; 707/3; 707/10; 707/201
(58) Field of Classification Search ................. 707/202, 707/201, 104, 10, 3, 203
See application file for complete search history.

(56) References Cited

U.S. PATENT DOCUMENTS

| 5,870,765 | A | 2/1999 | Bodge et al. | |
|---|---|---|---|---|
| 5,873,096 | A | 2/1999 | Lim et al. | |
| 6,092,189 | A * | 7/2000 | Fisher et al. | 713/1 |
| 6,446,092 | B1 * | 9/2002 | Sutter | 707/203 |
| 6,978,282 | B1 * | 12/2005 | Dings et al. | 707/204 |
| 7,032,089 | B1 * | 4/2006 | Ranade et al. | 711/161 |
| 2003/0055828 | A1 * | 3/2003 | Koch et al. | 707/10 |
| 2003/0172158 | A1 * | 9/2003 | Pillai et al. | 709/225 |

* cited by examiner

*Primary Examiner*—Jean M Corrielus
(74) *Attorney, Agent, or Firm*—Mintz, Levin, Cohn, Ferris, Glovsky & Popeo, P.C.

(57) ABSTRACT

Methods and systems for data maintenance in an offline-distributed database network system, which comprises a central system having a central database, and node systems having local databases capable of containing different subsets of data from the central database. First, change information relating to data stored in at least one of the central and local databases is recorded in at least one of the node systems. Then, a replication object including the change information is transmitted, if an online connection is available, from the recording node systems to the central system or from the central system to the recording node systems. The recipients of the replication object are determined based on at least one lookup table in the central system. The lookup table is updated in accordance with the change information of the replication object.

18 Claims, 15 Drawing Sheets

METHOD FOR DATA MAINTENANCE IN A NETWORK OF PARTIALLY REPLICATED DATABASE SYSTEMS

This application is a continuation application of and claims the benefit of priority under 35 U.S.C. § 120 to U.S. patent application Ser. No. 09/937,707, filed Oct. 1, 2001, now U.S. Pat. No. 6,910,053 which is a National Phase Application under 35 U.S.C. § 371 based on and which claims the benefit of priority under 35 U.S.C. §§ 365 and 119 to International Application No. PCT/DE00/01552, filed on Mar. 13, 2000, and based on German Patent Application No. DE 199 28 035.5, filed Jun. 18, 1999, and on European Patent Application No. EPO 99120009.8, filed Oct. 14, 1999. The disclosure of U.S. patent application Ser. No. 09/937,707 is expressly incorporated herein by reference.

The invention relates to a method for data maintenance in a network of partially replicated database systems, in particular relational database systems. The subject matter of the invention also covers a database system which operates using such a method, a computer program product for such a database system, and a data storage medium with such a computer program product.

Databases, in particular relational databases, are widely used for administration of data which are processed in data processing systems. In relational databases, the data form a large number of two-dimensional tables, which describe a relationship. A table may, for example, relate to an object and to data which can be uniquely associated with this object. For example, the customer data of a company can be stored in a "customer" table whose columns relate to different customer attributes (name, address, contact, turnover etc). The values for different customers form the rows in the table. The tables contained in relational databases relate not only to objects but also to relationships between objects. For example, when an order for a specific customer is processed, the "order" table which is generated for administration of the orders contains a "for customer" attribute which is used to define the customer-order relationship. Such pointers play a major role for representing relationships between objects which are described by different tables in a database.

Owing to the widespread use of portable computers (laptops), a task which often arises is to replicate the data stored on a central database system (database server) to a large number of local database systems which are installed, for example, on laptops. The local laptop database is used offline by its user (without any continuous link to the central database server). In the process, not only are the data from the local database retrieved but such data are also modified, added to or deleted on the basis of locally obtained information.

One typical example is customer management systems, which are also referred to as SFA (Sales Force Automation) or CRM (Customer Relation Management) systems. Such systems are matched in particular to the computer-processing requirements for customer advice, customer management and sales. This includes the company representatives being equipped with a laptop whose own local database contains all the data which the respective representative requires (for example on the basis of his sales area and the customers who are his responsibility).

The invention relates generally to offline-distributed database networks, in which the data are stored in a number of database systems in different computers (distributed) which are not continuously connected to one another (offline). Apart from laptops, other stationary or mobile computer systems, each having their own databases, can, of course, be involved as local database systems in such database networks.

In an offline-distributed database network, the data are normally interchanged between the database systems involved by means of messages. The messages are interchanged in a star configuration in a so-called hub structure, that is to say messages are transmitted from the local database systems only to the central database system, where they are processed and are passed on as required to other local database systems in the network ("nodes"). No direct data interchange between the local database systems takes place in a database network having a hub structure.

In the following text, the central database system is referred to as the central system. The term node systems is used for the local database systems in the database network.

The invention relates in particular to a database network having a hub structure. This database network, and/or the database systems involved in it, may, of course, be networked with further computer systems between which the data are not interchanged using a hub structure. The node systems in the database network system according to the invention may also themselves at the same time be the central system of a subordinate database network system but likewise organized in a star configuration, thus producing a tree structure.

As a rule, the computer systems involved in the database network according to the invention will not only contain a database system but also other applications which communicate directly with one another (without taking into account the hub structure). However, it is essential that the data interchange which is required for maintenance of the databases involved in the database network be carried out in a star configuration, in the manner described.

The maintenance of offline-distributed database networks is associated with major problems.

The local databases of the node systems cannot, and should not, be a complete copy of the central database. Firstly, the memory capacity is generally insufficient for this purpose. Secondly, the continuous maintenance of data which are not really required in the node systems would lead to unacceptable computation and connection times. Finally, security problems mean that comprehensive data relating to a company should not be completely replicated a number of times. This results in the object of partially and selectively replicating the central database of the central system in the local databases of the node systems such that each node system has available to it the data which it in each case requires.

A further problem results from the fact that data changes are recorded in different subsystems of the network which are significant to other subsystems and must be incorporated in their databases during the course of data maintenance. For example, a data change is recorded locally when a representative concludes a deal and in consequence generates an order in his node system database, when he records a new contact for a customer in the database and deletes the previous contact, or when he modifies a customer's address. These examples show that all three change operations which are normally carried out in database technology, that is to say insertion, modification ("update") and deletion, occur locally. Furthermore, large amounts of change information are generally processed in the central database, for example when product data (which are, of course, also required by the representatives) change, new products are introduced or previous products are discontinued. The following text uses the term "change information" as a comprehensive designation for the information on which the database operations of updating, insertion and deletion are based.

The necessity to allow local changes in each of the databases involved leads to the data integrity between the central system and the node systems (that is to say the consistency of the databases involved in the overall system) decreasing as the number of changes made increases. In order to ensure data consistency, it is necessary to make the contents of the offline-distributed databases match from time to time. Since data changes can be carried out in any computer system involved in the database network, the modified or added data must be compared with one another in the central database and in the local databases, and modified and new data must be interchanged as required. This data interchange is subject, inter alia, to the following requirements:

all updates must be reported to those subscribers within the overall system who require them, and not to any other subscribers;

new data must be inserted in all local databases which require them, and all data which are no longer required in one of the subsystems must be deleted.

The data interchange associated with the maintenance of offline-distributed database networks is extremely complex as a result of these requirements, particularly if one remembers that a large number of computer systems may be involved in the network. Owing to the worldwide activity of international organizations, some offline-distributed database networks have several thousand subscribers, or even several tens of thousands of subscribers.

U.S. Pat. No. 5,873,096 describes a method in which the change information is transmitted between the central system and the node systems by means of a data construct which is referred to as a docking object. The docking object contains (in the form of identification keys (identifiers) as a cross-reference to appropriate database contents) the change information and, at the same time, the distribution information which determines the responsibles of the change information, that is to say defines the node systems to which the respective change information contained in the docking object is intended to be transmitted. This distribution information is referred to as "visibility rules". All the change information in the entire database network is collated by means of appropriate transmission and mixing processes in a central change register (central update log) and is distributed from there—within the central system—to subregisters (partial update logs), the number of which corresponds to the number of node systems. This distribution takes place by applying the visibility rules for each individual node system (that is to say N times for N node systems) to every data change. This may be either direct application of a distribution rule coded as an SQL-SQL statement, or be carried out as a cross-reference to a "related docking object". The latter situation arises in cases in which the change information for the docking object currently being dealt with is distributed to the node systems in the same way as that for the related docking object. The change information gathered in this way in the subregisters is transmitted to the individual node systems when they set up a link to the central system.

This method, which corresponds to using the visibility rules to filter the data contained in the central change register, allows all the data changes (update, insert and delete) throughout the entire system to be distributed to the node systems selectively in accordance with predetermined rules However, the method is inflexible, particularly for adapting the database network system to different requirements. Furthermore, it is highly complex in terms of the computation times required. The performance is therefore inadequate for database systems having a large number of node systems.

The invention is based on the object of providing an improved method for distribution of the required change information to the node systems in an offline-distributed database network.

The object is achieved by a method for data maintenance in an offline-distributed database network system which comprises a central system having a central database, and a number of node systems having local databases, with the local databases at least in some cases containing different subsets of the data from the central database, change information relating to the data stored in the databases in the database network system being recorded in a number of node systems, the change information for an existing online connection being transmitted as replication objects, which are structured in a number of different types and contain an identification key, from the node systems to the central system or from the central system to the node systems, if there is no online connection, the replication objects being prepared, in an outbound queue, for subsequent transmission, the replication objects together with the change information being allocated as responsibles to the node systems to which they are intended to be transmitted by means of at least one lookup table in a replication algorithm in the central system, and the at least one lookup table being updated, in a realignment algorithm, taking account of the change information.

The invention will be explained in more detail in the following text with reference to an exemplary embodiment which is illustrated in the figures. The special features of the invention which are described in this context may be used individually or in combination in order to create preferred refinements of the invention. In the figures.

Figure 1:
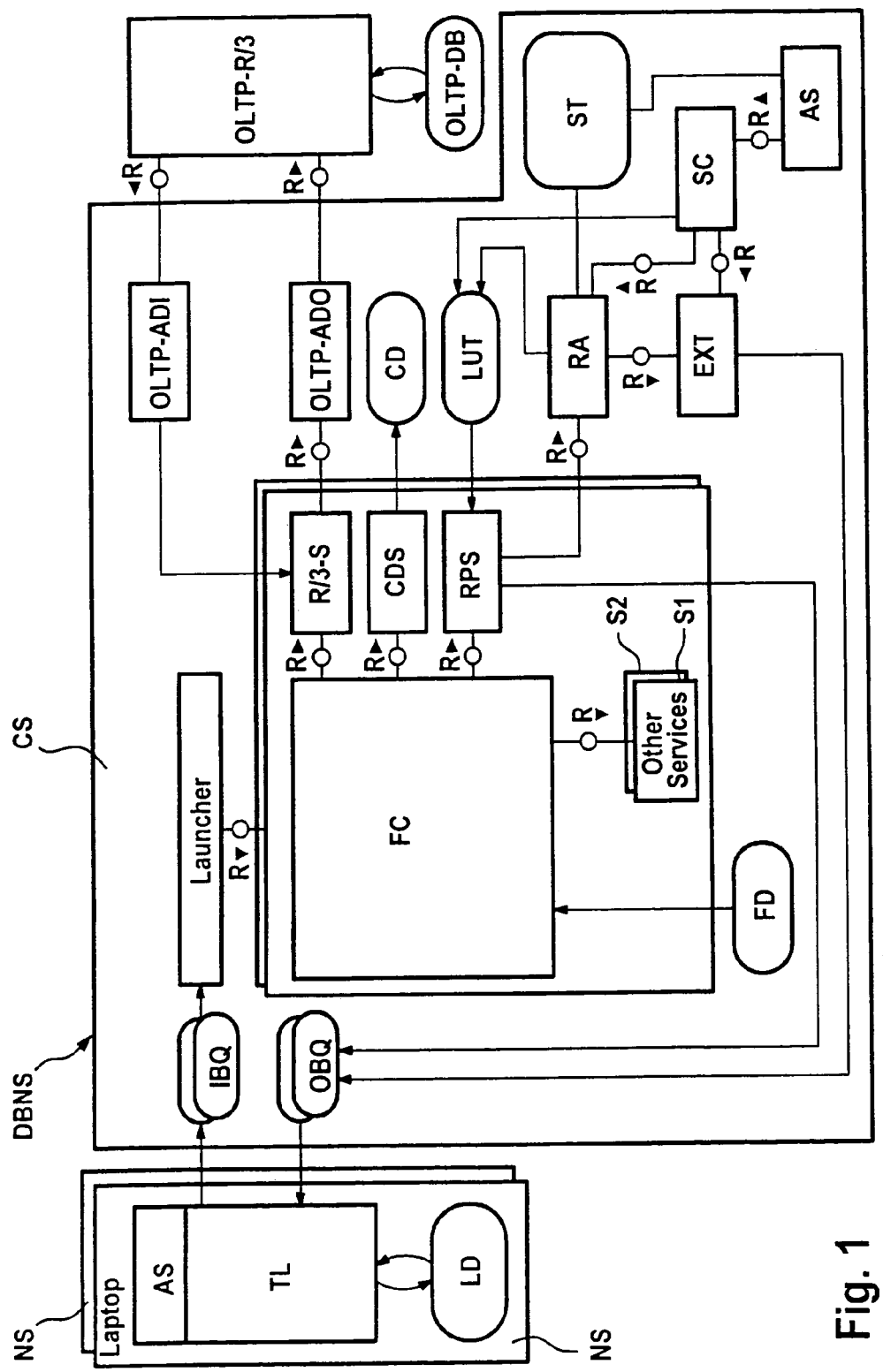
FIG. 1 shows a schematic illustration of the major elements of the architecture of a database network system according to the invention.

FIG. 1 provides an overview of the architecture of a database network system DBNS according to the invention, which comprises a central system CS and a number of node systems NS. This may be, for example, a CRM system, with the node systems NS primarily being in the form of the laptops used by company representatives. These are also referred to as mobile system clients. The representative can enter information (for example order information) in his node system NS and retrieve required data (for example relating to the customers he is working with and their orders) in his node system NS. In order to allow these functions to be carried out autonomously on a temporary basis, all the data required for this purpose are stored in a local database LD.

Apart from mobile clients, systems other than node systems may also be involved in the database network system, such as stationary computer systems in the company or from customers who are connected to the central system CS either continuously (online) or temporarily (offline). This allows, for example, customers to place orders directly without this having to be handled by any representative. The databases in such further computer systems may also form local databases LD in the database network system DBNS according to the invention organized on the basis of a hub structure (in which case they can also at the same time be included in other networks).

Change information which is also significant for the central system CS and other node systems NS is generated in the node systems NS (independently of one another). Depending on the specific system configuration, further change information can be generated in the central system CS itself. The central system ensures that each node system receives the necessary and permissible information. Its central database CD is also referred to as a consolidated database, since it contains the "public" (with regard to the data interchange between the databases involved in the database network system DBNS) content of all the local databases LD of the node systems NS (at the time of the last data interchange). "Public" in this case means data which are interchanged in the database network system. The local databases may, of course, also contain information which is not important to any other databases involved in the database network system CBNS and for this reason is "not public". The central database CD allows the local databases LD each to be supplied with the necessary data and, if necessary, also to reproduce the local databases LD.

The node systems NS are connected to the central system CS at intervals, for example every evening, via suitable communication paths (for example telephone lines, Internet or Intranet). In the process, the data which have been gathered since the last connection are transmitted to the central system CS. Furthermore, the node system NS uses this opportunity to transfer its own data processed in the respective preceding time period and newly entered data from other node systems NS or from the central system CS.

The entire-data flow between the application programs AS (application software) and the local databases LD of the node systems NS takes place using a transaction layer TL implemented in the node systems. This allows all the changes of the local database LD to be recorded before they are made persistent. The data transfer from the central systems CS to the node systems NS also takes place exclusively via its transaction layer TL.

The transaction layer TL is transparent, that is to say the application data which are transmitted from the application program AS to the local database LD are not changed by the transaction layer TL. On the output side, the transaction layer can interact, between different platforms, with differently implemented local databases LD.

In the case of the example of a CRM system, the data interchanged within the database network relate to business matters, for example customers, orders and the like. They are therefore referred to as business data. The data interchange in the database network system DBNS takes place by means of structured replication objects which have an identification feature (ID key) and which are referred to as "BDoc". BDocs are data containers with a respectively predetermined structure for one BDoc type, as will be explained in more detail in the following text. These form the atomic unit for the replication in the database network system DBNS. For example, a BDoc for a specific order contains data which are associated with that order, irrespective of how such data are present in the logical structure of the databases LD and CD which are involved (as tables in a relational database). The control data which are required for operation of the node systems NS and of the central system CS are stored in a logically separate part of the respective databases LD and CD, and this is referred to as the repository.

In the exemplary embodiment illustrated in FIG. 1, the central system CS is connected to a further system, which is referred to as OLTP-R/3. OLTP-R/3 is an ERP (Enterprise Resource Planning) system of SAP AG, Walldorf, Germany. Such ERP systems allow computer assistance to widely differing company areas, such as personnel, sales, stores etc., on the basis of a common database, which is referred to in FIG. 1 as OLTP-DB. The central system CS of the database network system DBNS may be connected to the ERP system OLTP-R/3 via, for example, a LAN (Local Area Network).

Where the following text refers to the replication objects used for transmission of change information as "BDoc", to the central system as the "CRM system" and to the ERP system which is connected to the central system CS as "OLTP-R/3", this is intended to be by way of example, without any limitation to generality. The described special features apply in general to the functions used in the scope of the invention for corresponding replication objects and computer systems even in other software environments.

The data transmission between the node systems NS and the central system CS—and optionally to other external systems as well—takes place by means of a functional module which is referred to as qRFC (queued remote function call). This is a remote call in which additional intelligent features are used to ensure that qRFCs in a queue are processed successively and that common data required for a number of calls are stored only once in the process.

The data processing in the central system CS takes place using program modules, which are referred to as "service" or as "adapter". A service provides a specific function which can be applied to a BDoc. An adapter is a specific type of service, which also allows connection to an external system. A dedicated adapter exists for each external system and is generated specifically for the respective BDoc type in conjunction with BDoc modelling on the basis of repository entries. It is used to translate the protocol and the data structure of the external system for the central system CS.

The flow controller FC is the central component of the CS system. Based on flow definitions FD, it ensures that BDocs are processed by transferring incoming BDocs in the correct sequence to the services and adapters and, if necessary, initiating an error handling procedure. This is done generically for all services and adapters via the same interface. The flow definitions FD are defined specifically for the BDoc type in a control data memory (repository).

The BDocs transmitted by the node systems NS are stored in an inbound queue IBQ, and are transferred from there by means of a launcher LCH for processing by the flow controller FC.

The communication with the ERP system OLTP-R/3 takes place using an appropriate service R/3-S and two adapters, namely an outbound adapter OLTP-ADO and an inbound adapter OLTP-ADI.

A consolidated database service CDS is used for storing data in the consolidated database CD. The service CDS does not carry out any check for data consistency when writing data to the database CD. Such checks must be carried out by the node systems which are transferring data to the central system. The other program modules do not use the database service CDS to read the database CD, but an extractor module EXT, which can be called as required.

A replication service RPS is used to replicate data from the central system CS to the necessary extent in the node systems NS. It accepts the processed BDocs and determines their responsibles by reading from a lookup table LUT (only the abbreviation "LUT" will be used from now on in the following text). The LUT is preferably a very simple two-column table which in each case allocates the keys (Site ID) of all the responsibles to the primary keys of the BDocs. It is indexed and access takes place using logarithmic timings, so that the responsibles of a BDoc can be read out very quickly even if the LUT is very extensive.

If the replication service RPS finds that the responsible allocation in the LUT must be changed as a consequence of a BDoc which is currently being processed, it generates a realignment job for a realignment module RA. During realignment, the realignment module uses replication rules which are stored in a subscription table ST. Furthermore, the realignment module RA uses an extractor module to transfer change information for the node systems NS to the flow controller, which provides them in an outbound queue, which is referred to as OBQ for transmission to the node systems NS.

Additional services S1, S2 can be implemented for further tasks. Since the said program modules are defined specifically for each BDoc type, the symbols shown in FIG. 1 (for example CDS, RPS) each symbolize a series of corresponding modules for all the BDoc types used in the database network system. The symbol LUT also preferably represents a number of lookup tables for different BDoc types.

The programming language ABAP from SAP AG, and their R/3 technology, are preferably used for implementing the software in the central system CS. This is transparent to different platforms. The functions of the central systems CS can be distributed between a number of machines. In particular, separate machines can be used for the database and for processing requirements and system administration.

In practice, it is expedient for the machine used for system administration to be one which is referred to as an administration station AS and can, for example, run under Windows NT.

A subscription checking module SC (subscription checker) is used to update the LUT when, in the course of system administration, system changes are carried out on the administration station which are of importance for distribution of change information to the responsibles. Two different types of subscription checking module SC are preferably used for this purpose—depending on the BDoc type—with a first type producing changes in an LUT directly, while a second type carries out such changes indirectly, using the realignment module.

The structure of the BDocs will be explained in more detail with reference to FIG. 2.

An essential feature of the replication objects (BDocs) used for the invention is that they form a logical unit which ensures that the change information contained in it is transported and processed once and once only. Thus, in particular, the BDocs form a bracket which ensures that data transmission to a receiver is not regarded as having been successful unless it is complete. This is an important precondition for complete and correct replication. Without this function of the BDocs (for example in the event of system crashes) there would be a risk of only partially transmitted old data being regarded as being complete. This would lead to replication errors.

As already mentioned, a BDoc is a data container (that is to say a predetermined structure which is filled with different data). A distinction must be drawn between different BDoc types with (generally) different structures. For example, there may be "customer", "product" etc. BDoc types. The individual examples (entities) of the BDocs then contain the data for a specific customer, product etc.

The BDocs are preferably used for transmitting data between platforms and between applications, that is to say they allow data transmission between computer systems which use different platforms (operating system and database administration system) and in which different applications are implemented. In order to ensure this can be done, the structure of the database systems involved must be mapped in the BDocs. This is done in the course of a preparatory process, which is referred to as BDoc modelling. In this case, segments of the BDocs are defined on the basis of the tables in the databases. The segments contain links (in the form of corresponding keys) to the corresponding tables in the databases. Thus—according to one preferred embodiment—the BDocs do not physically contain the data items themselves, but links to the data stored in the databases. However, logically this means that they form a container for transporting the data.

For example, in a database with "offer header" and "offer items" tables, corresponding BDocs of the "order header" type contain a link to the "offer header" database table (which contains the core data, for example identification of the customer, offer number and the date of an offer). A BDoc "order item" arranged below the BDoc "order header" contains a link to the "offer items" database table (in which the individual items of the offers are stored). In simple cases, the association between tables in the databases and segments of the BDocs which are involved is unique at the two ends. However, there are also situations in which table contents are split between a number of BDocs or contents from a number of tables are combined in one BDoc.

Overall, the BDocs represent breakdown of the entire (in the sense defined above) public data set of all the database systems involved. The term "breakdown" should in this case be understood in the mathematical sense that all the public data in the database are transferred to a BDoc once, and only once (without any overlap and completely).

From what has been stated above, it is clear that the entity formed by all the BDocs forms a map of the public data of the database systems involved in the database network system DBNS. In consequence, the structure of all the databases involved must be taken into account, at the semantic level, in the course of the BDoc modelling. Furthermore, the special features of the branch for which the database network is used: must be taken into account in the course of the BDoc modelling. In practice, this is done by the software manufacturer supplying a branch-dependent base model which is referred to as a "template". This is used as the basis for user-specific adaptation in the course of implementation of the system for a specific company.

Figure 2:
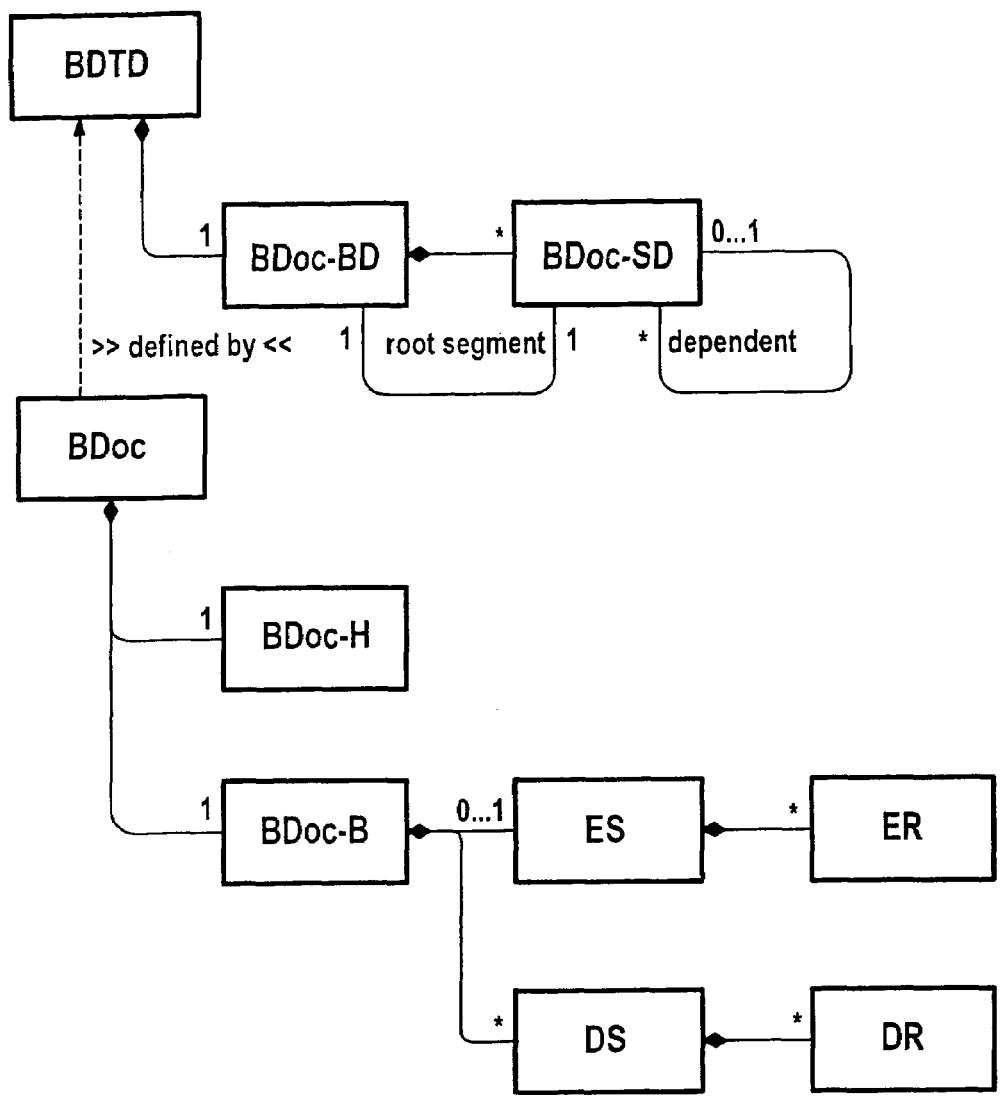
FIG. 2 shows the structure of replication objects (BDocs) which are used for the purposes of the invention.

The upper part of FIG. 2 shows the structure of the definition of the BDoc type. The structure of the BDoc itself is shown in the lower part. Both structures are stored in the repository in the central system CS.

The BDoc comprises the BDoc header BDoc-H and the BDoc body BDoc-B. The BDoc header BDoc-H contains control information such as the type ("customer", "order" . . . ) of the BDoc, its sender (node system NS) and a time stamp. For performance reasons, it is advantageous for it also to contain a duplicate of the primary key.

The data are contained in the BDoc body BDoc-B. A flag in the root segment is used to indicate the database operation (update, insert or delete) to which the change information coded in the BDoc corresponds. A data record DR contains the actual data. The structure is defined in the definition of the associated data segment DS. The segments form a type of table view of the actual physical tables. Optionally, the BDoc also contains an error segment ES with one or more error records ER.

The data areas have a defined length. These comprise a key and data fields. If they contain deletion information, only the key field contains valid data. If they contain "insert" or "update" information, either all the fields contain valid data or unchanged fields contain a default value (for example 0.0). So-called "send bits" are used to indicate whether a field is filled or is unused. Primary keys and fields which must be taken into account during replication and realignment are always sent (irrespective of whether they have been changed). Send bits are set only when the value has actually been changed.

The definition of the BDoc type, that is the information about the structure specific for the respective BDoc type from hierarchically organized elements, is contained in the BDoc type definition BDTD, which comprises a BDoc body definition BDoc-BD and BDoc segment definitions BDoc-SD. The BDoc body definition BDoc-BD contains one, and only one, root segment, which contains only a single data record. This condition must be satisfied in order to ensure that the information contained in the BDoc can be transmitted individually to the respective node systems, or can be processed in some other way. For example, a "customer" type BDoc may contain stored information about only a single customer, so that the customer information can be supplied to the appropriate node systems individually and specifically for each individual customer.

While the segments in the BDoc type definition BDTD are structured hierarchically, there is no such hierarchy for the process of physically passing on the BDocs. The BDocs contain the hierarchical relationship by the data records DR of dependent segments containing the key of their higher-level data records.

For the performance of the system, it is important that the BDocs transmit logically only the respectively required change information. This is also referred to as "net field transmission". They thus contain the complete data record for the respective entity of the respective BDoc type (that is to say, for example, all the data relating to an order) only in the case of an insert. In the case of an update, apart from the identification of their type and the BDoc entity—seen logically—they contain only the contents of the modified data field (that is to say, for example, a change in the street address of a customer). In the case of a deletion, it is sufficient to transmit the required identification keys.

The flowcharts explained in the following text relate to the example of a CRM system. In this case, the central system CS is also referred to as the "CRM server".

Figure 3:
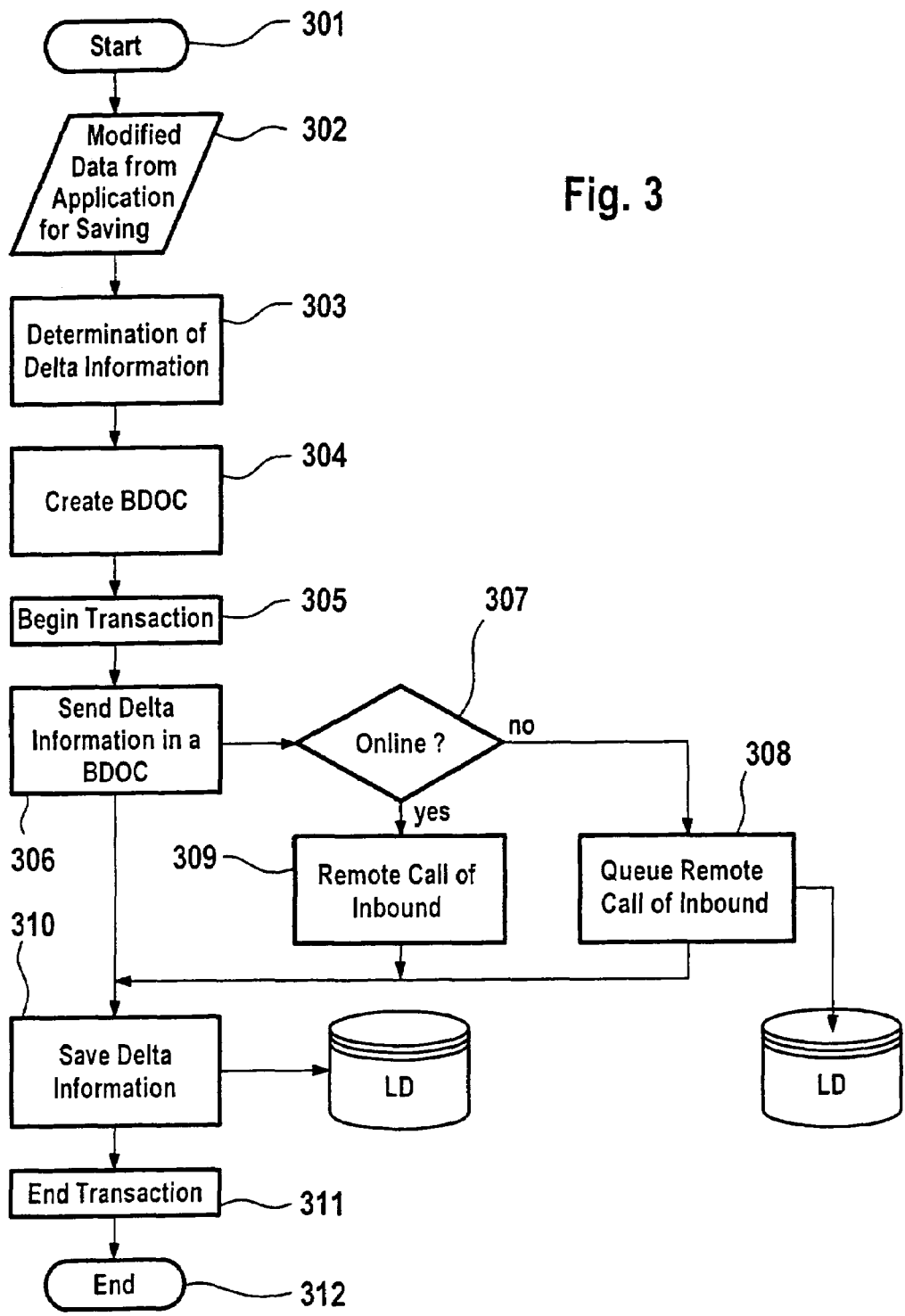
FIG. 3 shows a flowchart of a program module for dealing with change information obtained locally (in a node system)

FIG. 3 relates to the handling of change information originating from the node systems NS, that is to say which has first been implemented in their application program AS ("up-load"). This program section is therefore also referred to as "application modification handling", and is part of the-transaction layer TL.

After starting application modification handling (step 301), the step 302 is used to transfer data which have been modified by the application program AS and are intended for storage in the local database LD, by means of the transaction layer TL. After this, in step 303 of the same commit cycle, the new information (delta information) contained in the modified data record is determined, and a BDoc is generated as a transfer format in the step 304, containing—as described—a unique key and the modified information.

The subsequent steps 305 to 311 are carried out in the same commit cycle. These form a transaction, in the sense that they must necessarily be carried out completely, that is to say each operation element of the transaction is carried out only if all the other operation elements have been carried out.

In the present case, the transaction relates to the operations 306 "send delta information in a BDoc to the central system" and 310 "store delta information in the local database LD". Programming as a transaction ensures that these operations are carried out only if the execution of both operations is guaranteed.

Step 306 is followed by step 307, in which a check is carried out to determine whether the relevant node system NS is currently connected to the central system CS (online). If the result of this check is positive, a remote call is immediately transmitted to the inbound queue IBQ of the central system CS. The BDoc to be transmitted forms an attachment to the remote call.

As a rule, there will be no online connection to the central system CS. In cases such as this, the negative result from the check 307 means that a remote call is placed in an outbound queue in step 308, and is stored in the local database LD in-the node system NS.

This queue, like all the other queues, is subject to the following conditions:
  The system ensures that each call to the queue reaches its
    receiver, otherwise an error signal is produced (guaranteed delivery).
  The calls to the queue are processed in the predetermined
    sequence (in order processing)
  Each call is carried out once, and only once (exactly once).
  In step 310, the change information is incorporated in the local database LD. In the process, the transaction layer TL breaks the BDocs down into tables, with all the data records of all the associated tables being processed in one commit cycle. Inserts are entered in the database by means of an SQL statement. Changes are incorporated net (likewise by means of an SQL statement).

Figure 4:
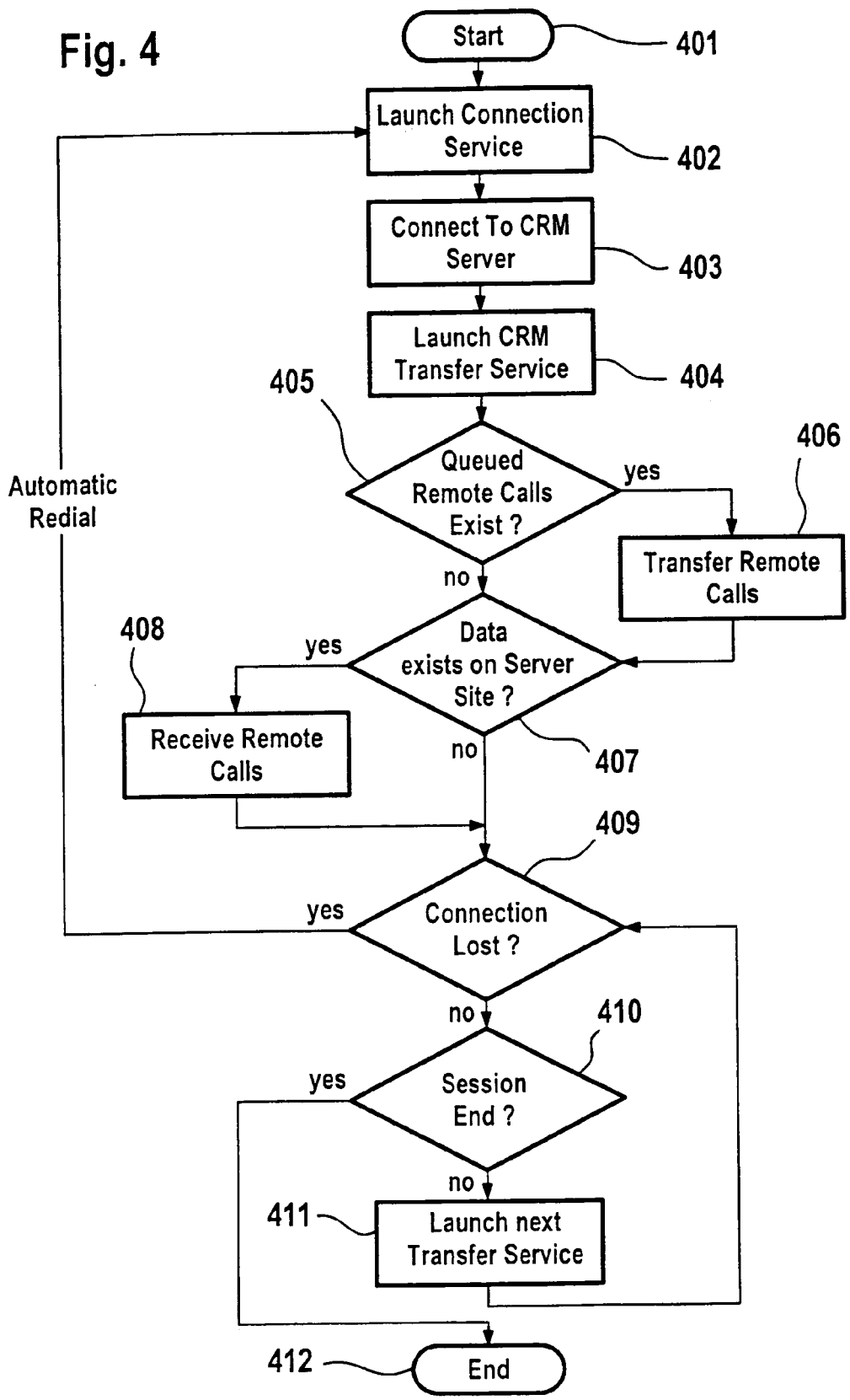
FIG. 4 shows a flowchart of a connection manager, which produces and monitors the temporary connection between a node system and the central system.

FIG. 4 shows a flowchart of the software module which is used to produce the link which is required for the data interchange between the computer systems involved, to maintain this link, and to end it after completion of the required data interchange. This module is referred to as ConTransManager CTM but, for the sake of clarity, is not shown in FIG. 1. It is designed such that it operates fully automatically, that is to say no further user action is required after calling the CTM.

After starting the CTM in 401, a connection service is called in step 402, by means of which, in step 403, a link is produced to the central system CS. This comprises, for example, dialling the telephone number, IP address, password etc., and corresponds to normal techniques. A CRM transfer service is then called, in step 404, which ensures that the BDocs in the outbound queue of the transaction layer TL of the corresponding node system are transmitted by means of a remote call. As long as such remote calls exist, they are transmitted successively in step 406, on the basis of the check 405. If there are no further remote calls, the response to the check 405 is negative and the procedure goes to the check 407, to determine whether there are any data for the corresponding node system at the central system end. If the response to this is affirmative, such data are transmitted to the node system in step 408.

The check 409 "connection lost?" ensures that, if the result is positive, control passes to step 402, which produces a new connection by means of the connection service 402. If the result is negative, the check 410 "session ended?" is used to confirm whether any other transfer services which can be implemented in the central system CS (such as the transmission of e-mails) need to be called. If this is the situation and, in consequence, the session has not yet been ended, the next transfer service is called in step 411, otherwise the procedure is-ended (step 412).

The processing of BDocs in the central system CS is carried out by means of the flow controller FC. A launcher process processes the inbound queue IBQ and starts a flow for each received BDoc. A graph for each BDoc type is defined in the flow definitions FD and is used to monitor the BDocs passing through all the defined services. This is done completely generically. The specific processing depends on the defined services, in which case the services not only transport the BDocs, but can also modify their contents, for example adding additional fields or removing existing field contents. One example is the insertion of system-wide keys for semantic integration of different database systems, which is described in European Patent Application 99120009.8 "Integrated composite database system" from the same applicant. This application is referred to in the sense that its contents are intended to be used fully to supplement the contents of the present application.

Figure 5:
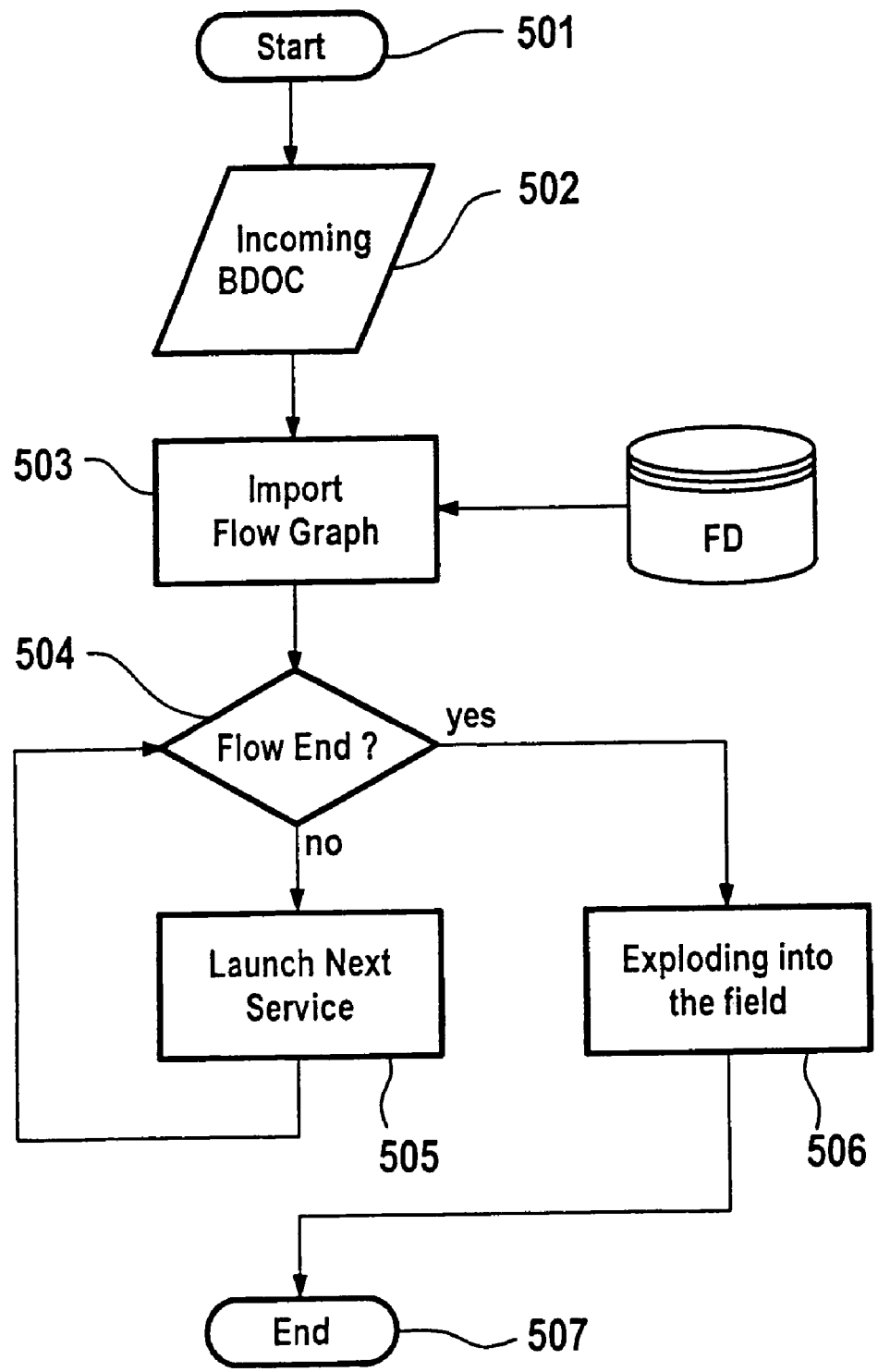
FIG. 5 shows a flowchart of the processing of BDocs in the central system by means of a flow controller.

FIG. 5 shows the general features of the flow controller FC. If, after the start 501 of the flow in step 502, a BDoc is transferred to the flow controller for processing, the further flow takes place on the basis of a graph which is imported from the stored flow definitions FD in step 503. The required services from the flow definition are processed in accordance with this graph. For normal BDoc types (for example customer, order), the flow passes, for example, through the following services, inter alia:
a) a service R/3-S in order to make the change information accessible to the company ERP system as well (if relevant for this system, otherwise the R/3 service is not defined in the flow of the corresponding BDoc type).
b) A service CDS in order to make the change information persistent in the consolidated database CD. For this purpose, the database service CDS breaks the BDocs down into tables and processes all the data records of all the associated tables in one commit cycle. Inserts are entered in the database by an SQL statement. Updates are incorporated net (likewise by means of an SQL statement).
c) A replication service RPS, in order to enter in a responsibles list (recipient list) the node systems NS responsible-for the change information.

The processing of all the flow services defined in the imported graph is ensured by a loop which comprises a check 504 "flow ended?" and a step 505, which is used to call the next service if the answer to the check is negative.

Once all the services have been processed, the distribution of the change information to the node systems NS, which is referred to in FIG. 5 as "Exploding into the field", takes place in step 506 (as the final step of each flow controlled by the flow controller FC). In the process, the flow controller uses a remote function call to call the responsibles using the responsibles list. Normally (specifically when there is no online connection to the node system being called at that time) this results in the calls being queued in the outbound queues OBQ of the individual node systems. If an online connection exists, the call can be passed on immediately. In the event of an error, the procedure branches to an error handling service in order to initiate defined error handling actions.

In the following text, FIGS. 6 to 15 will be used to explain the major special features in conjunction with selective transmission of the change information from the central system CS to the node systems NS. The sequence of program modules will be described which, according to preferred embodiments of the invention, are used to ensure that the change information is distributed to the respective correct responsibles within the node systems even in the event of continuous dynamic changes to the data in the database network system DBNS, with relatively little computation complexity and with good performance. At the same time, the system is intended to ensure the maximum possible flexibility not only with regard to adaptation to the requirements from widely differing user groups, but also with regard to subsequent adaptation of already installed systems to match changing requirements.

In this case, the following functions play a major role:
replication by means of a replication service RPS
realignment by means of a realignment module RA
extraction by means of an extract service EXT
subscription checking by means of a subscription checking module SC.

Figure 6:
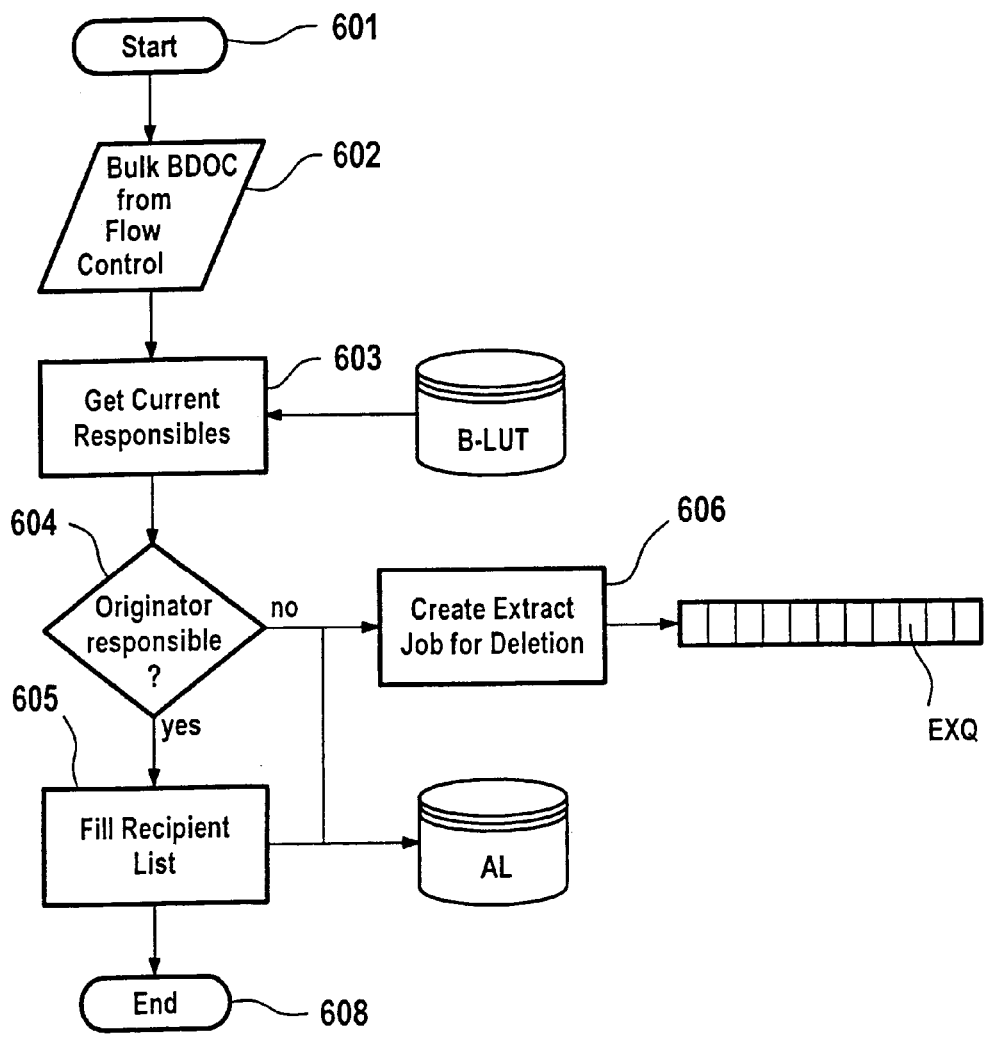
FIG. 6 shows a flowchart of replication of the "bulk replication" type.
Figure 7:
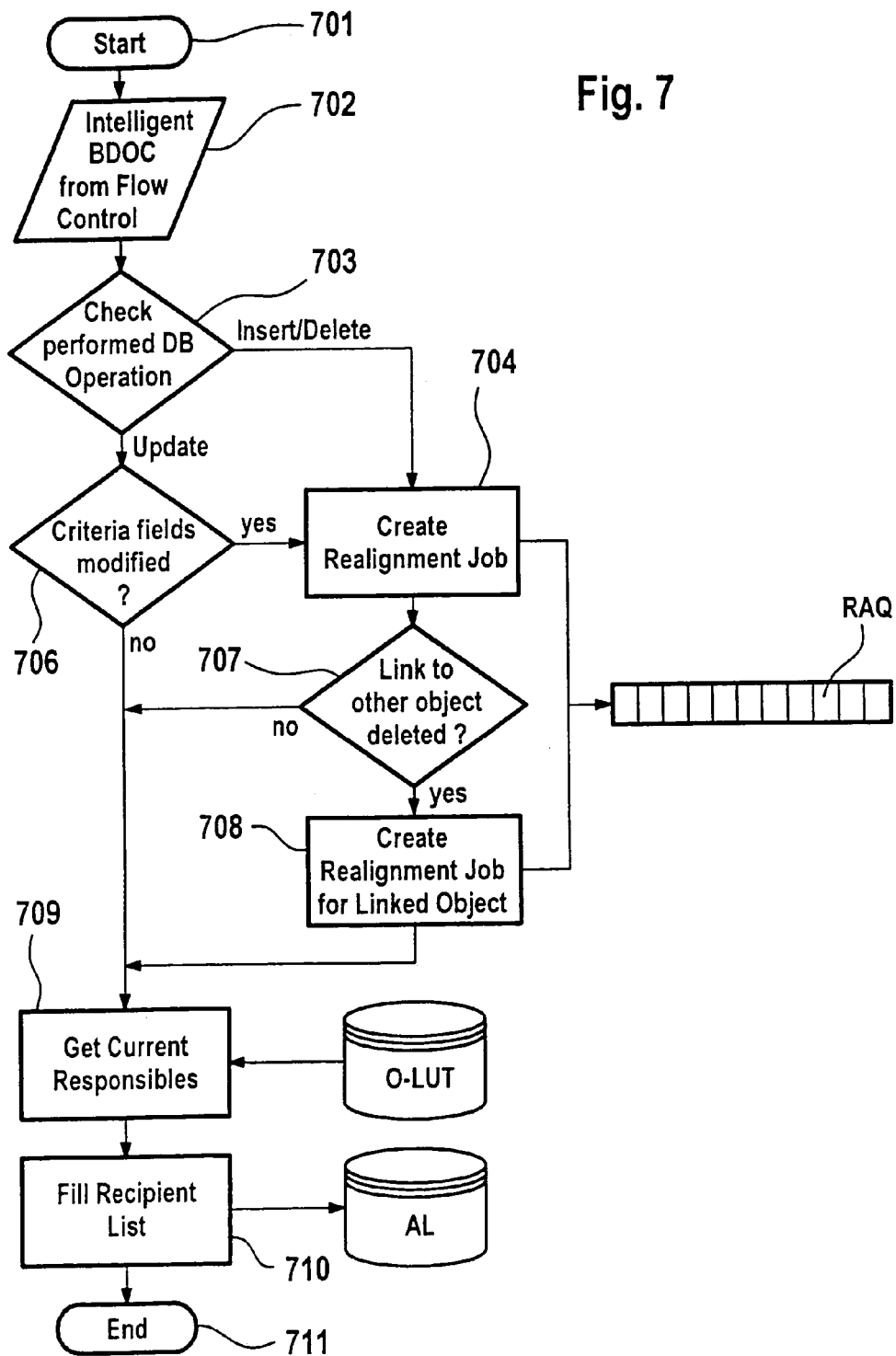
FIG. 7 shows a flowchart of replication of the "intelligent replication" type.
Figure 8:
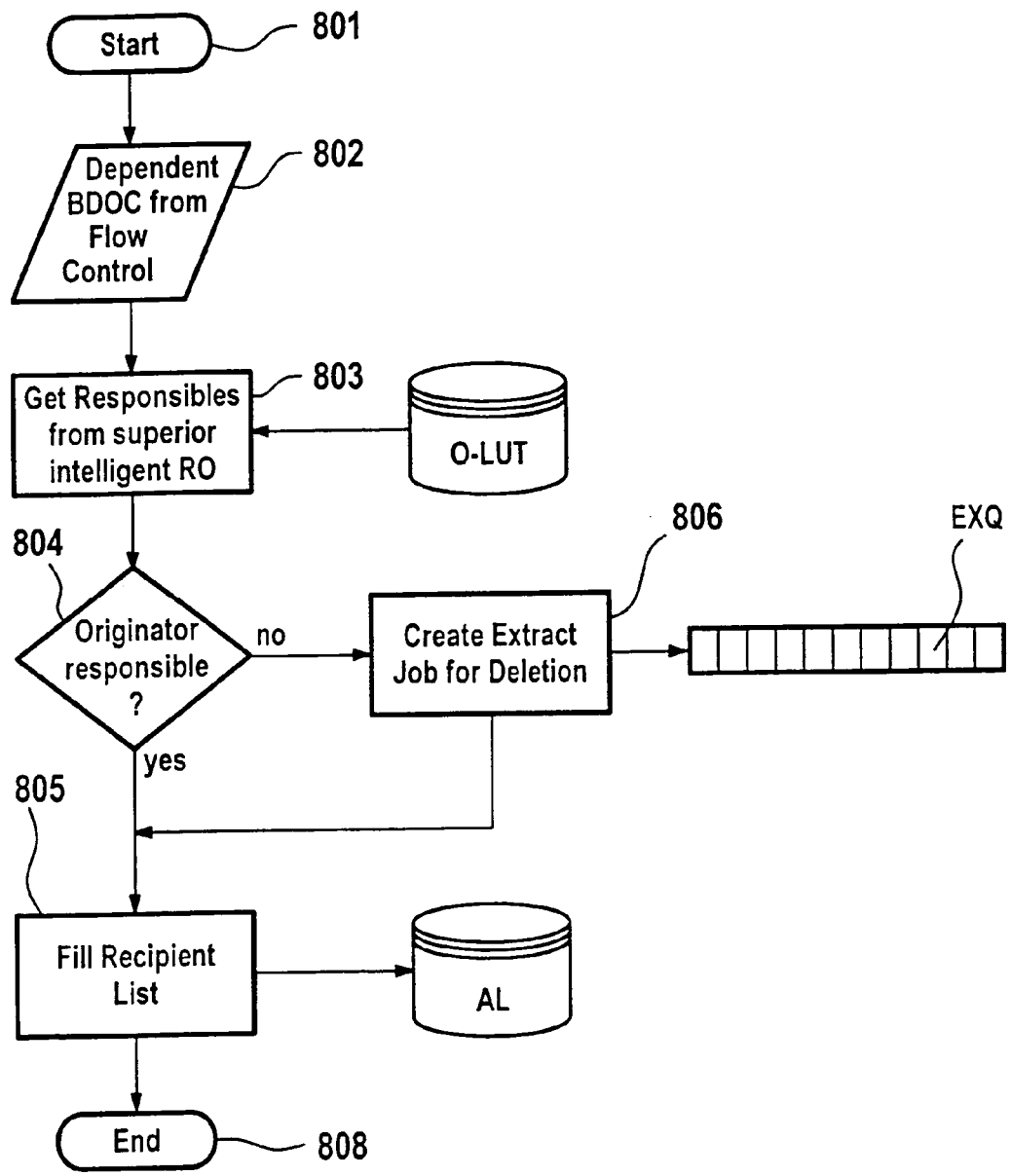
FIG. 8 shows a flowchart of replication of the "dependent replication" type.

In the program flowcharts illustrated in FIGS. 6, 7 and 8, which use three different basic types to describe the replication, it is assumed that there is a specific BDoc type for processing. As already explained, the BDoc types which are used in a specific database network system DBNS are defined in the course of the BDoc modelling while the system is being set up. Replication by means of a replication service RPS is defined specifically for the BDoc type, that is to say a specific replication service is defined for each BDoc type, although, of course, the same replication service can be used for a number of BDoc types. When the database network system DBNS is being set up, the required replication services are generated by means of a generic engine and control data stored in a repository. Each replication service starts by the flow controller transferring a BDoc and calling the service.

To assist understanding, the following explanatory notes refer to a CRM system by way of example, in which the representatives are each responsible for a specific physical sales area. Specific customers, who are looked after by the representatives, are located in each of the sales areas.

When the name of a contact for a customer changes, the change information associated with this must be transmitted as an update to all the representatives in the respective area. This is done in the course of replication.

However, for some change information, it is insufficient only to pass it on to the appropriate responsibles in accordance with the current LUT. In fact, the change information in many cases leads to the LUT also having to be modified. This includes all change information of the insert and delete types, since the insertion of new replication object entities (for example a new customer or a new order) must in each case lead to appropriate updating of the lookup table (insertion of the responsibles for the new replication object entity, deletion of the associations for the replication object entity which no longer exists). Updates can also lead to adaptation of the LUT. One example is when a customer moves from a sales area A to a sales area B. First of all, this leads to changes in the "address" field in the "customer" BDoc. For the purposes of the invention, such an update is taken into account when the change data are distributed to the responsibles by defining a corresponding data field (for example a data field which contains the postcode for the customer address) as a "distribution-critical field". As will be explained in more detail later, a change in a field such as this can lead to changes in the LUT. Updating of the LUT is part of the realignment function.

Such an address change means that the customer data must be transmitted to all the node systems in sales area B, and must be deleted from the node systems for the previous sales area A. This means a change to the LUT. Thus, when a "customer" type BDoc is being processed whose address field contains a change, it is first of all necessary to find out whether this change in a distribution-critical field actually leads to a change to the distribution. If the answer is negative, the change must be reported to all the node systems in the previous (unchanged) sales area A. If the answer is positive, it must be reported to all the node systems in the new sales area B while, at the same time, it is deleted in the node systems in the old sales area A. Insert and delete operations, which are initiated in the course of realignment, are required to incorporate these changes. However, preferably, they are not carried out immediately, and an extract job is generated which is processed independently and asynchronously by the extractor model EXT. The extractor module produces BDocs which can be transmitted to one of the databases involved in the database network system DBNS in order to carry out an insert or delete operation.

Finally, there is a need to take account of system changes which are carried out by the system administrator via the administration station AS. This applies in particular to reorganizations of the database network system which result, for example, from the insertion of additional node systems or from other changes to the rules applicable to the distribution of change information to the responsibles (which lead to a change to the subscription table). Changes such as this are incorporated in the system by means of the subscription checking module SC.

FIG. 6 shows the program sequence of a replication service type which is referred to as bulk replication. This is used for BDocs which are transmitted to specific responsibles as a function of their type (but independently of the respective BDoc entity and its data contents). A typical example is core data which must be available to every company representative, for example relating to the company products (BDoc type "Product core data").

Bulk BDocs such as this can be processed easily and with minimum computation time (that is to say very quickly) within the scope of the invention. FIG. 6 shows one typical algorithm.

After the start 601 and transfer of the BDoc 602 by the flow controller, the present responsibles (current responsibles) for the BDoc type are read from the LUT in step 603. A filter function in the database software can be used for this purpose. The LUT in each case allocates the keys (Site ID) of all the responsibles who are listed as subscribers to this BDoc type in the subscription table to the primary keys of the BDoc types. A common LUT, which is referred to as B-LUT (bulk LUT) in FIG. 6, is preferably used for a number of bulk replications, or for all of them (that is to say for a number of BDoc types, or all of them, which is/are distributed to the responsibles in the course of bulk replication).

The next bulk replication step 604, involves a question as to whether the sender of the BDoc is among the responsibles for the change information contained in it. If the answer is affirmative, the responsibles list is entered in the header BDoc-H of the BDoc, in step 605. This is preferably physically done by cross-reference to a data record, which defines the responsibles list, in a responsibles list AL which contains the keys (Site ID) for the responsibles.

It is also possible for the author of change information (that is to say the node system in which the change information contained in the BDoc was recorded) not to be one of the responsibles and, for this reason, for the question 604 to lead to a negative result. This possibility is linked to the fact that the system is intended to allow data interliasing. For example, it is possible for a representative from a sales area A to stand in for a colleague and enter changes from a sales area B in the system and to use his own laptop for this purpose, although this is associated with sales area A.

In a case such as this, before the responsibles list (step 605) is created, an extract job is placed in an extractor queue in step 606 and leads to deletion of the corresponding receiver information, as will be explained in more detail further below. This is necessary to prevent the modified data record from remaining in the node system associated with sales area A even though it is not only not required there but—since it is not maintained—rapidly becomes out of date and leads to data inconsistencies.

The intelligent replication illustrated in FIG. 7, and the dependent replication illustrated in FIG. 8, can be combined under the generic term "object replication". This refers to situations in which the distribution to the responsibles is dependent not only on the BDoc type, but on the individual BDoc entity, that is to say the respective data object. A distinction can be drawn between the following situations, in this case:

the contents of a distribution-critical field can lead to the LUT for this BDoc, and possibly also for BDocs linked to it, having to be modified. This is done by "intelligent replication", in which a realignment job is generated.

Although the replication has to be carried out at the BDoc entity level (on an object basis), this is done as a function of a higher-level object. Such a relationship between the replication objects generally corresponds to a corresponding relationship for the tables in the databases involved in the database network system. One typical example is orders, which are always linked to a customer (orders exist only from a customer). For this reason, all the orders from a customer must be distributed to the responsibles in precisely the same way as the customer data themselves. The BDoc type "order" is, however, used for a large number of orders from different customers. Each entity of this type contains a field for identification (GUID) of the customer, which indicates the higher-level replication object for which a relationship exists, and which is used for distribution to the responsibles.

FIG. 7 shows an algorithm for intelligent replication. Once the service has been started 701 and the BDoc transferred (field 702), this is followed by a question asking for the database operation type (defined in a field in the BDoc).

If this is an insert or a delete, a realignment job is generated in step 704. This does not mean that realignment is carried out immediately. In fact, a command is just produced which is placed in a realignment queue RAQ and is processed asynchronously, at any desired time.

If the database operation coded in the BDoc is an update, a question 706 is asked to determine whether a distribution-critical field has been modified. If the answer is positive, a realignment job is once again generated in step 704.

The production of a realignment job is always followed by a question 707 asking whether the BDoc contains a link to other BDocs (replication objects). If the answer is positive, a realignment job is also generated for the linked object, in step 708. This relates, for example, to situations in which the customer has based himself in sales area A but is part of a concern whose headquarters are in sales area B. This information is coded in the appropriate customer BDoc by means of a link and is used in step 708 to ensure that both the representatives in the area A and the representatives in the area B receive change information which is important to them owing to the location of the parent company.

In any case, the algorithm is continued in the same way as in FIG. 6 by reading the up-to-date valid responsibles from the LUT (without taking into account the changes which may result from processing of the present BDoc) and using this as the basis, in step 710, to create the responsibles list in the header of the BDoc.

In some cases, the responsibles list contains no entries. If, for example, the data coded in the BDoc which is passing through the algorithm illustrated in FIG. 7 relate to a new customer (generally the case for all inserts), the O-LUT for the new replication object does not contain any entries. Distribution to the node systems responsible for the new customer does not take place until realignment.

Since intelligent replication takes place at the BDoc entity level, that is to say there must be assignments for all the responsibles in the LUT for each entity, this results in very extensive LUTs (for example for a mail-order company having a large number of customers). The entity responsible allocations for a BDoc type are preferably combined to form a common LUT, which is referred to as the O-LUT (object LUT).

It is particularly preferable for there to be one B-LUT (address allocations of the BDoc types distributed by bulk replication) and a large number of O-LUTs in the central system CS, which each contain the allocation of the responsibles (Site IDs) for each individual entity in a BDoc type distributed by means of intelligent replication.

Step 711 marks the end of the service (the BDoc is handed over to the flow controller FC).

FIG. 8 shows the sequence, referred to as "dependent replication", of a service for replication of a BDoc, the passing on of which to the responsibles is dependent on a higher-level BDoc (referred to as RO=replication object in FIG. 8). In this case, once the service has been started 801 and the BDoc transferred (step 802), step 803 uses a lookup table to ask for the responsibles of the higher-level BDoc (that is to say, for example, for the customer for whom an order is being carried out) from the LUT. The further steps 804 to 808 correspond to the steps 604 to 608 for bulk replication (FIG. 6).

It is clear that dependent replication is a simple algorithm, which can be carried out very quickly. This is of major importance for the performance of the overall system since, in practice, the number of dependent replication objects is generally very high.

FIGS. 9 to 12 will be used to explain the functions which are carried out by a realignment module RA. These are broken down into two subtasks, namely:

the updating of the LUTs on the basis of data changes in one of the local databases LD or in the consolidated database CD, and initiation of the insert and delete operations required on the basis of such changes.

The realignment is carried out using the batch method, asynchronously and at any desired time, which is normally defined by the system administrator. Since the realignment module is not monitored by the flow controller FC, it is not referred to as a service. The process of carrying out the alignment asynchronously, independently of the replication, is of major importance with respect to uniform coding of the overall system (load balancing). If, for example, the realignment is carried out at night, this reduces the load on the system at the peak usage time, thus improving the performance.

The realignment jobs in the realignment queue preferably contain only the primary key for the respective BDoc (which uniquely identifies the BDoc entity, for example a specific customer) and the identification of the BDoc type. The data contents of the BDoc are checked, if required, on the basis of the primary key from the consolidated database CD. The BDoc type is the governing factor for the way in which the data are assigned to the nodes.

Figure 9:
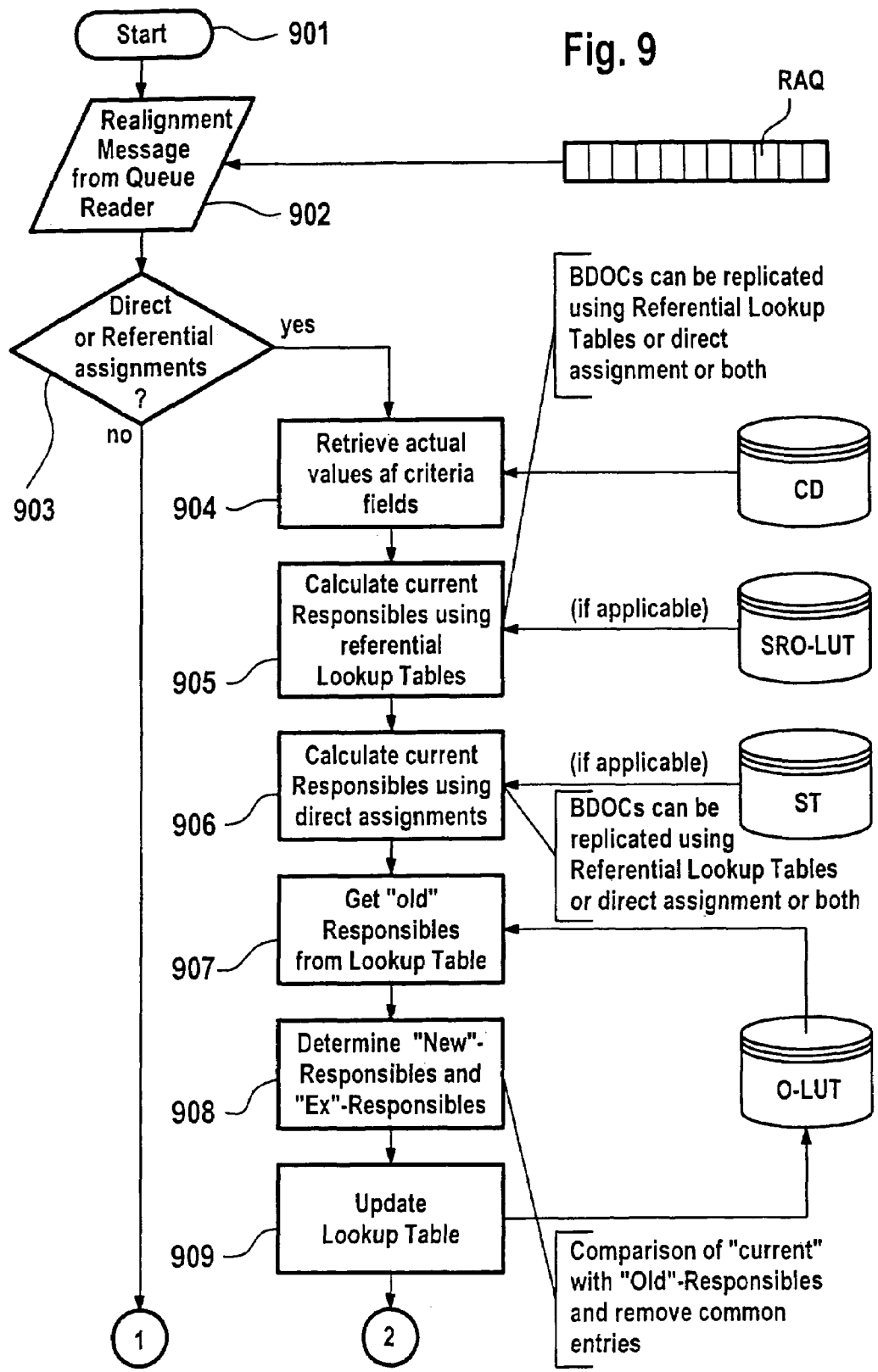
FIG. 9 shows a first part of a flowchart of a realignment program module.
Figure 10:
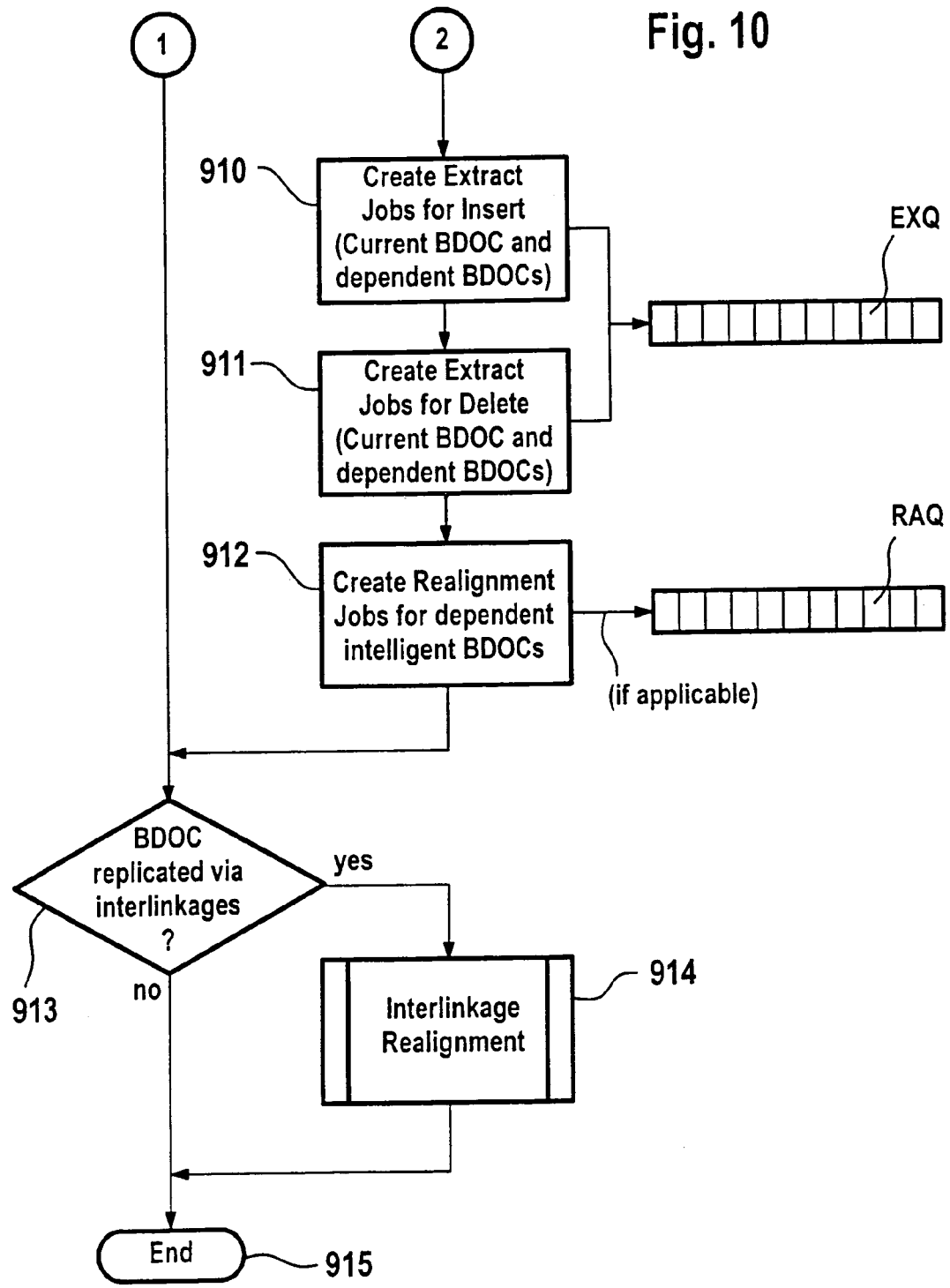
FIG. 10 shows a continuation of the flowchart from FIG. 9.

FIGS. 9 and 10 show the program sequence for a realignment algorithm with the exception of the "interlinkage" function, which will be explained later with reference to FIGS. 11 and 12.

After the start 901, the jobs in the realignment queue RAQ are transferred sequentially by a queue reader, in a step 902. Sequential processing ensures that the sequence is the same as that in which the change information on which the realignment jobs are based have been processed in the central system CS.

The type of assignment is then checked, in step 903, that is to say the nature of the assignment between the BDoc in the realignment queue RAQ and the node systems NS. This assignment depends on the BDoc type. The type of assignment to be used for the individual BDoc types is stored in the repository. A distinction is drawn between the following options:

a) Direct Assignment.

This assignment is used for situations in which the responsibles are directly dependent on the data contents of a field in the BDoc. For example, the sales area field is checked to determine the responsibles, and the responsibles are defined, depending on the contents of this field, on the basis of the subscription table ST stored in the CS repository.

b) Referential Assignment.

This type of assignment is used in situations in which the responsibles can primarily be read from an already existing LUT for a higher-level replication object but in which an intelligent check based on data contents is also required. One example is orders, which are distributed to the responsibles who look after the respective customers, essentially (as explained further above) depending on the customers for which they are being processed. If there is no need to take account of any additional distribution criteria, this distribution takes place as a dependent replication, in accordance with FIG. 8. In these situations, no realignment is required, and there are no realignment jobs in the realignment queue.

However, there are situations in which additional criteria must be taken into account for the distribution to the responsibles. This applies, for example, to networks in which the node systems NS are used by architects. A frequent situation in this case is where an architect is looking after a specific building site (order) even though he is not based in the area of the customer (building site company) and is therefore not responsible for this area. In this situation, the data relating to the building site must be distributed not only—as dependent replication—to the node systems located in the sales area of the customer but also (on the basis of an intelligent check of a specific field) to the architect responsible for this building site.

c) Interlinkage.

This type of assignment will be explained in conjunction with FIGS. 11 and 12.

In the case of a direct or referential assignment, the program sequence jumps to steps 904 to 912, which are carried out successively (in some cases optionally).

In step 904, the contents of the distribution-critical fields of the BDoc are transferred from the consolidated database CD. The following steps 905 and 906 are optional in the sense that at least one of the steps is carried out depending on the nature of the assignment and the BDoc being processed, and in which case step 905 may also be carried out more than once.

In step 905, the new responsibles (current responsibles) are asked for from LUTs for higher-level replication objects SRO-LUT (Lookup table of superior replication object). This may be necessary more than once if the processed BDoc contains links to a number of higher-level objects (for example an order which is being carried out for a number of customers, for example a building site for a building site management company).

The new responsibles are calculated in step 906, on the basis of direct assignment. This is done by comparing distribution-critical fields in the BDoc with a subscription table ST which is stored in the repository. Both steps 905 and 906 may be required for a referential assignment. Only step 906 is carried out for a BDoc with direct assignment.

Figure 14:
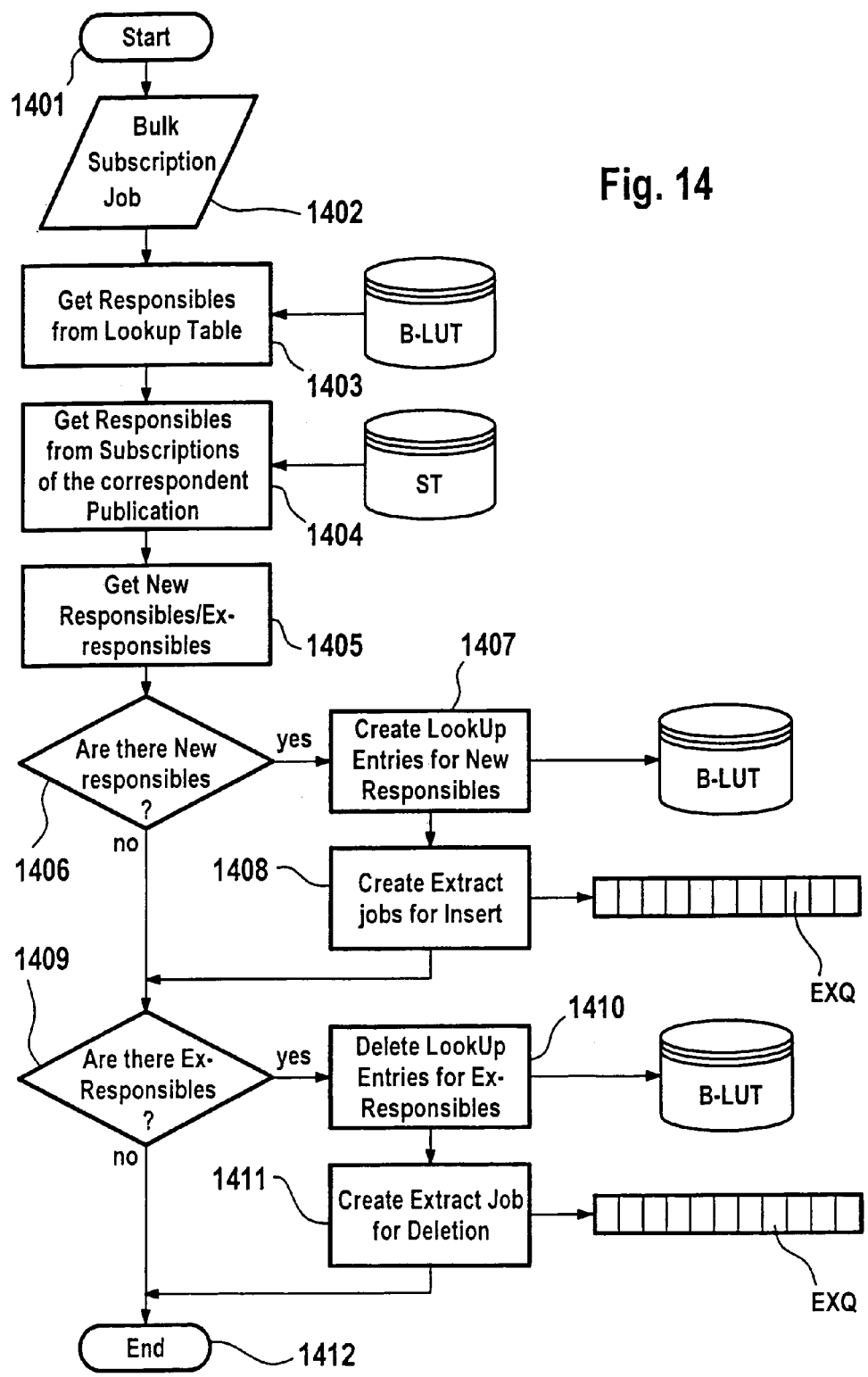
FIG. 14 shows a flowchart for a bulk subscription checking module.
Figure 15:
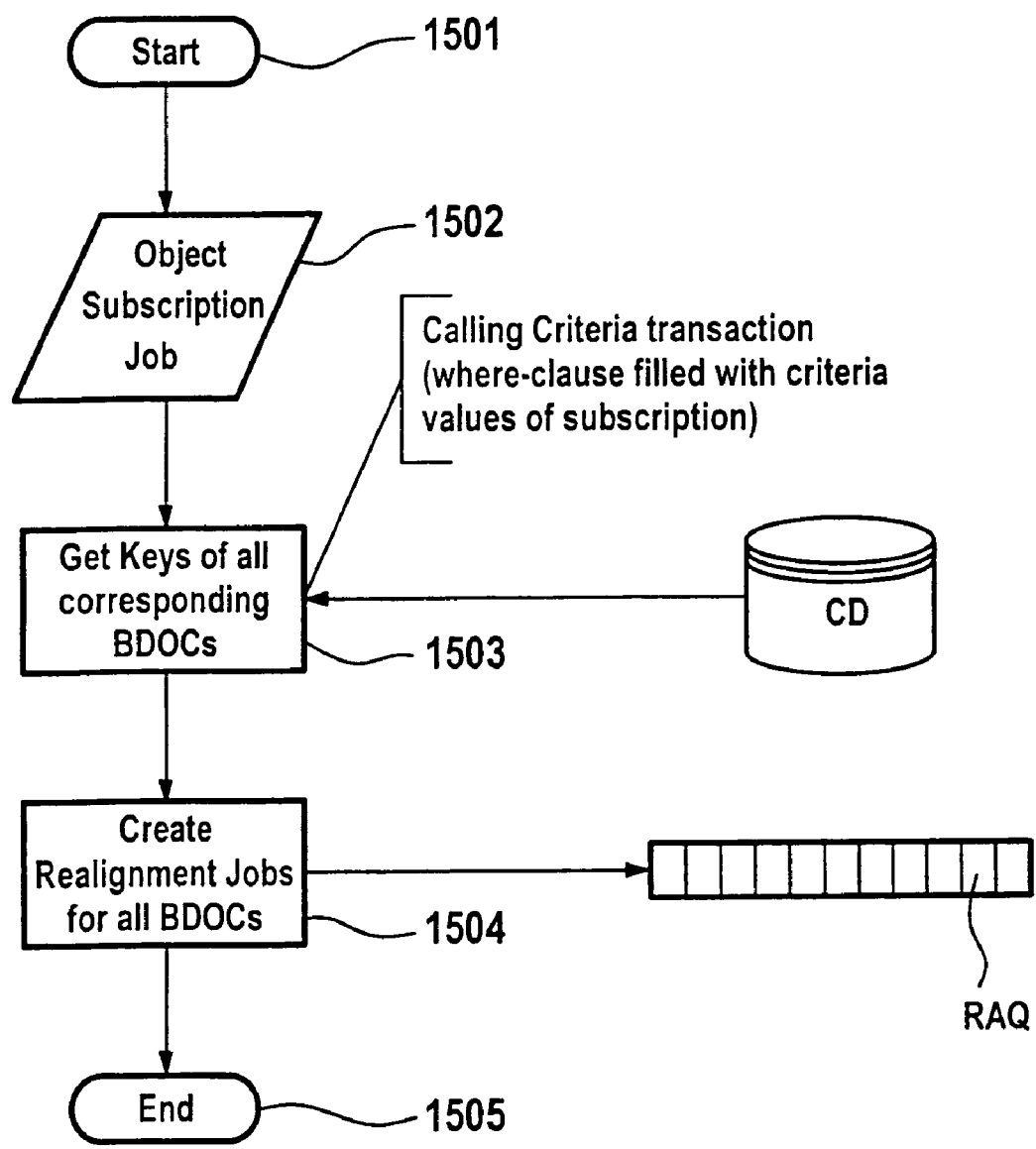
FIG. 15 shows a flowchart for an object subscription checking module.

For their part, the subscription tables ST are modified frequently, that is to say they are highly dynamic. If, for example, a new representative is used in a sales area A, the system administrator carries out a modification so that the representative XY is inserted as a new subscriber for the changes relating to sales area A. The changes to the subscription table ST which result from this are processed by the subscription check (FIGS. 14 and 15).

Steps 907 to 909 are used to carry out the necessary updating of the lookup table for the processed BDoc. If the responsibles for the change information remain unchanged, no change is required to the LUT. For this reason, the "old" responsibles are first of all read from the LUT in step 907 and a comparison is carried out, in step 908, between the present and the old responsibles, in order to determine additional ("new") responsibles and ("ex-") responsibles who are no longer up-to-date.

The changes required to update the LUT are defined on this basis in step 909. However, the update is not yet active at this time, that is to say the changes are not carried out at this stage, but are only marked (by setting a flag). This is of considerable practical importance, in particular because it is necessary to prevent changes for a specific node system being placed in the outbound queue OBQ even though this has not yet been filled with the basic data for the relevant replication object (insert). Thus, with regard to the example under discussion, it is necessary to prevent a change to a contact with a customer being prepared for transmission to a specific laptop before this laptop contains the customer data items themselves.

The steps 910 and 911 illustrated in FIG. 10 are used to initiate the necessary insert operations for the new responsibles, and delete operations for the ex-responsibles. The extract jobs (see FIG. 13) required for this purpose are generated, and are placed in the extractor queue EXQ. This in each case relates to the BDoc currently being processed and, possibly, to BDocs which are dependent on it.

Extract jobs also have to be produced for BDocs which are dependent on the BDoc currently being processed, in order to ensure that all the necessary information is transmitted during the provision of the initial data for a node system NS. If, for example, the data for a new customer are being transmitted to the responsible representatives, the new responsibles must receive not only the data for this customer but also further data (for example relating to contacts, orders for the customer and the like).

The insert operations result in all the new responsibles receiving the entire data record for the BDoc entity currently being processed. All the data for this BDoc entity are deleted for the ex-responsibles. This provides the precondition to allow future data changes for this replication object to be transmitted to the new responsibles as well, and to prevent such changes from being transmitted to the ex-responsibles. The new responsibles and the ex-responsibles are now therefore transferred to O-LUT, that is to say the updating of O-LUT, which has not yet been carried out, is activated. This is preferably done in the same commit cycle as the production of the extract jobs.

Finally, in step 912, follow-up orders are generated, and placed in the realignment queue, for BDocs which are distributed in accordance with their own rules and are additionally dependent on higher-level replication objects ("dependent intelligent BDocs"). One example is situations relating to referential assignment, as has been explained. If, for example, the BDoc currently being processed is an order which, in the case of the described architect system, contains a link to an architect, an additional realignment job is generated for this architect.

A further question 913 is used to find out whether the BDoc being processed must also be replicated via interlinkage. If the answer is positive, an interlinkage realignment takes place in step 914, and this will be explained in more detail with reference to FIGS. 11 and 12. After completion of the interlinkage realignment or if the response to the previous question is negative, the service is ended (915).

The dependent replication shown in FIG. 8 allows only 1:N relationships to be processed, such as those between a customer and the orders being processed for that customer. However, in practice, cases of N:N relationships frequently also occur. If, for example, in the case of the architect system mentioned above, an architect is responsible for a building site of an "out-of-area" customer, who is based outside this architect's area of activity, although he receives the data for the building site (order) in the course of the referential assignment, he does not receive the data for the customer. He receives the customer data by means of a link to the customer provided in the "order" BDoc. This is an interlinkage between different BDoc types (order-customer). However, links also frequently exist between different entities for the same BDoc type in order, for example, to take account of relationships between different customers which affect the distribution of change information.

Tasks such as this are carried out by the program module referred to as interlinkage. This is dependent on appropriate links having been defined when the system was set up, or at some later time. The definition of links can also be produced by the application software AS in the node systems NS, for example if a representative finds a relationship between customers which has not yet been taken into account in the system. Such change information is also coded into BDocs, is transported to the central system CS and is processed recursively there, in order to generate appropriate links.

All links between BDocs (of the same type or of different types) are preferably stored in the consolidated database CS as so-called interlinkage table. This table contains the assignments between the keys (GUIDs) of all the replication objects which are linked to one another (preferably in pairs in a two-column table). The BDocs contain the information relating to links originating from them, preferably by cross-reference to such an interlinkage table.

This is dependent on the keys used for identification of the BDocs being unique throughout the entire system, that is to say no key is used more than once, to identify different replication object entities, anywhere in the entire database network system (DBNS). This precondition is, of course, satisfied for GUIDs.

Figure 11:
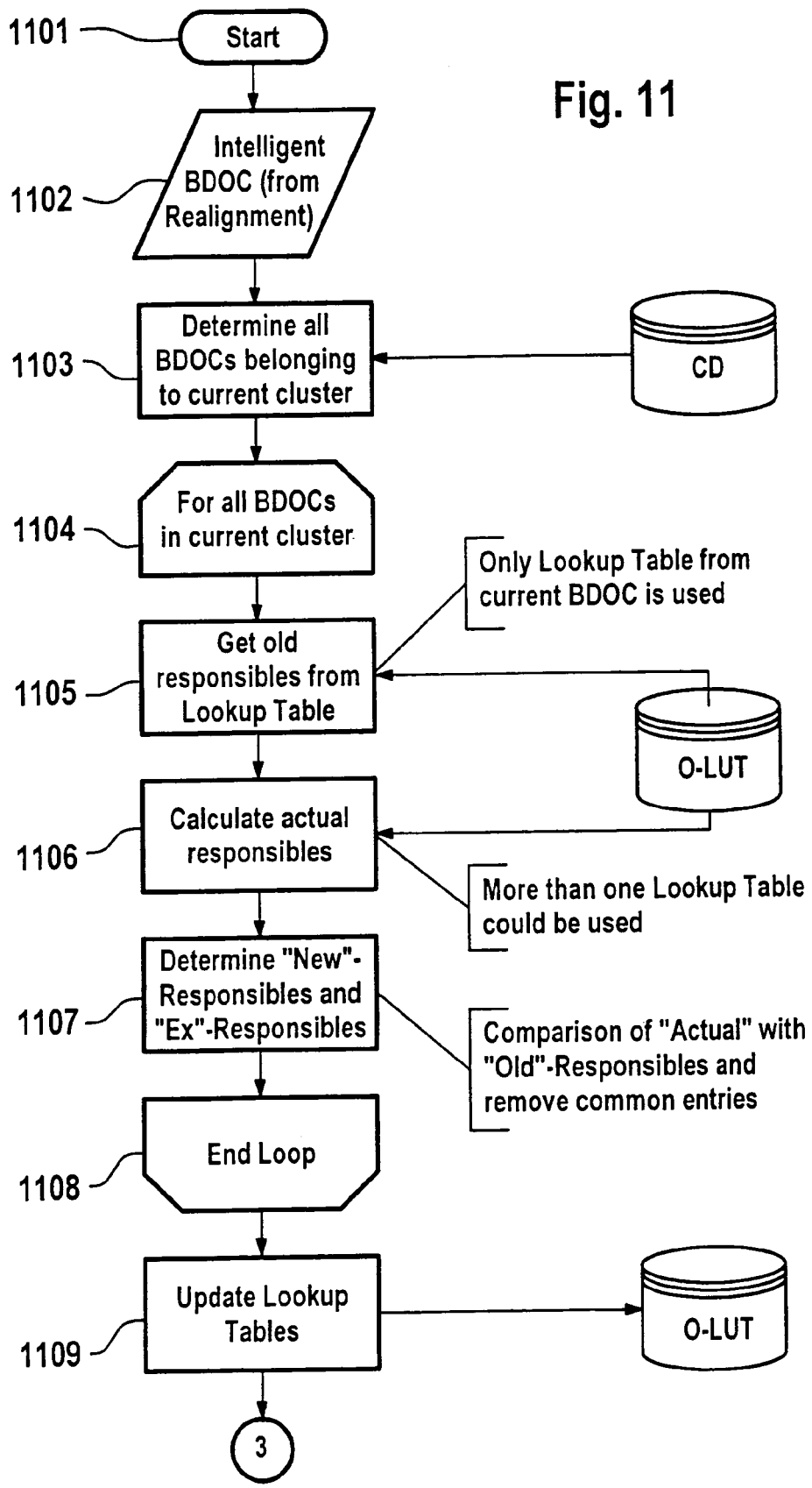
FIG. 11 shows a first part of a flowchart of a program module for carrying out the interlinkage realignment shown in FIG. 10.
Figure 12:
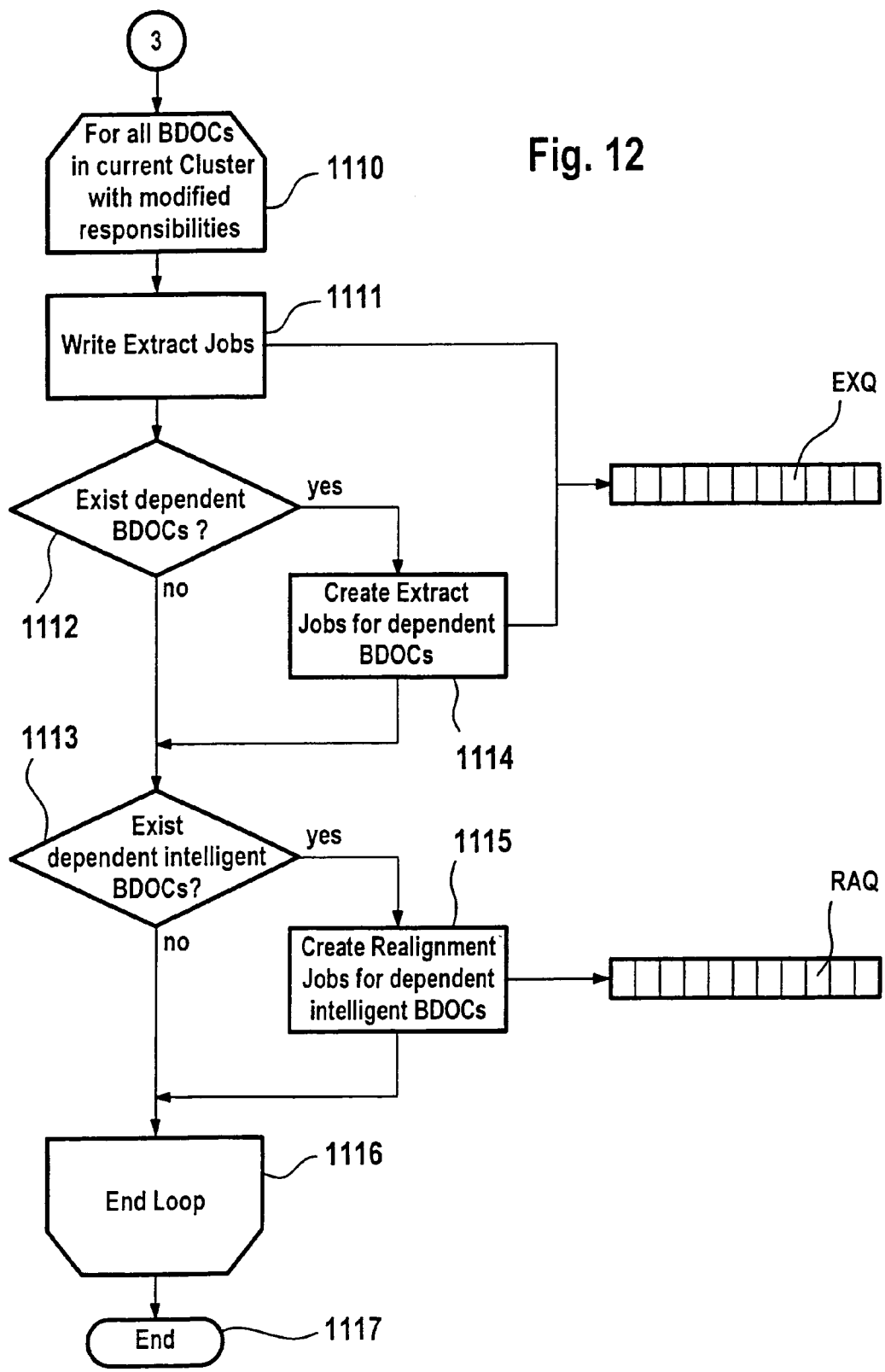
FIG. 12 shows a continuation of the flowchart from FIG. 11.

FIGS. 11 and 12 explain the steps which were combined as the field 914 in FIG. 10. After the start of the program module 1101, and the transfer of the BDoc (step 1102), all those BDocs which are connected to one another by links (that is to say pointers in the consolidated database CD) are first of all combined, in the step 1103, to form a "cluster". Specifically, a list is created of the primary keys of all the BDoc entities which are linked to one another by links. These may be of different BDoc types and are processed jointly in the subsequent algorithm. This can be done by using keys which are unique for all types (for example, GUIDs). This joint processing is important for the performance of the system. The processing time can be shortened considerably by processing the BDocs using algorithms for all types.

Where the above text refers to "all" links being combined by links to form a cluster this applies, of course, only provided there are no restrictions relating to the distribution of the data (for example owing to their confidentiality).

The for-loop which is illustrated in FIG. 11 and comprises the steps 1104 to 1108 is carried out for all the BDocs in a cluster. In this case, in a similar way to that for steps 907 and 908 in FIG. 9, the current responsibles are determined and compared with the old responsibles in order to define (new) responsibles which have been added and (ex-) responsibles who are no longer up-to-date. In this case, definition of the current responsibles does not necessitate referring back to the subscription table, but can be done directly from the LUT of the BDoc since there is no need for calculation of responsibles by means of assignment in this algorithm.

The subsequent updating of the LUTs in step 1109 is carried out analogously to the procedure in FIG. 9. It is important for performance that this step is carried out jointly for all the BDocs in the cluster, once the previous loop has been processed completely.

The steps illustrated in FIG. 12 for initiation of the required insert and delete operations are also carried out analogously to the procedure in FIG. 10 but in a further for-loop, which comprises steps 1110 to 1116, and in which all those BDocs in the cluster for which modified responsibles result from the previous loop are processed successively.

Since realignment is a process consuming a large amount of computation time, parallel processing of the jobs in the realignment queue RAQ may be expedient. This is permissible, but care must be taken to ensure that the processing of the realignment jobs for one BDoc entity takes place in the same sequence as that in which the realignment jobs were created (in the course of replication). In other words, the realignment jobs for a replication object entity must always be processed in the sequence in which they were produced. In the case of parallel processing, for example, this can be ensured by all the realignment jobs for a BDoc entity always being placed in the same realignment queue, and thus necessarily being processed successively.

As explained, the realignment module RA is used not only to update the LUTs, but also to initiate the insert and delete operations required as a consequence of LUT changes. These change operations are carried out by generating an extract job, which is processed independently and asynchronously by the extractor module EXT. The extractor module is also used in another context to produce BDocs which are used for carrying out an insert or delete operation in one of the databases involved.

Figure 13:
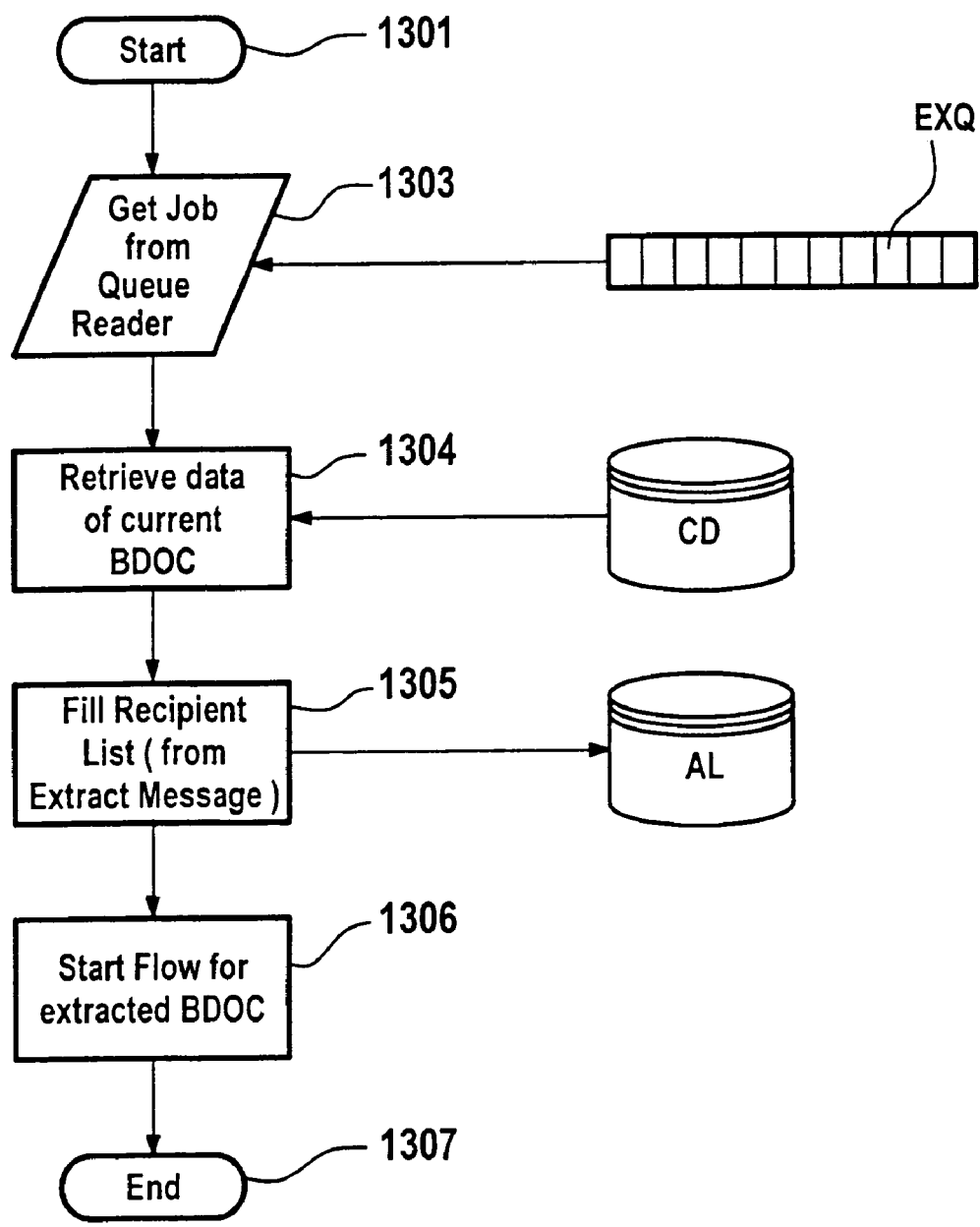
FIG. 13 shows a flowchart for an extractor program module.

The flowchart shown in FIG. 13 illustrates an algorithm that is suitable for the extractor module. After the start of the module 1301, a job is transferred, in step 1302, from the extractor queue EXQ by means of a queue reader, which ensures sequential processing. The extractor job contains the primary key of the BDoc to which it relates and the addresses (site IDs) of one or more node systems in which the insert or delete operation is intended to be carried out. If this is an insert operation, data for the BDoc are read from the consolidated database CD in step 1304. Then, in step 1305, the addresses of the responsibles are entered in the BDoc header BDoc-H (once again by cross-reference to an address list AL). Finally, in step 1306, the extracted BDoc is transferred to the flow controller FC, and the flow is started. The step 1307 marks the end of the module.

Changes to the LUT, and insert and delete operations required on the basis of such changes can result not just from change information transmitted from the node systems NS. In fact, as already described, changes which are made by the system administrator via the administration station AS in many cases lead to a change to the information distribution within the database system. In particular, changes are frequently required to the subscription table ST, for example when new representatives are appointed and their laptops are intended to be included as node systems in the database network system DBNS, or if changes relating to the assignment of the node systems NS to the sales areas result (for example one or more of the representatives changes to a different sales area).

Changes such as this are incorporated in the system by means of a program module which is referred to as a subscription checking module SC (subscription checker). FIGS. 14 and 15 show flowcharts of algorithms for two types of subscription checking modules SC, which are used depending on the BDoc type. The bulk subscription checking module illustrated in FIG. 14 is used for those BDoc types which are replicated by bulk replication as shown in FIG. 6, while the object subscription checking module illustrated in FIG. 15 is used for those BDocs which are replicated by intelligent replication as shown in FIG. 7.

After the start 1401 of the bulk subscription checking module, a bulk subscription job, generated in the administration station AS, is transferred in step 1402. For a BDoc distributed in the course of bulk replication (for example product core data), this job contains links to all the responsibles applicable for the current standard. In step 1403, those responsibles registered in the bulk LUT for the appropriate BDoc are read from said bulk LUT. Then, in step 1404, the links contained in the bulk subscription job are used to read the corresponding subscribers from the subscription table ST. New responsibles and (ex-) responsibles who are no longer up-to-date are determined by comparing the data obtained in steps 1403 and 1404. If a subsequent question 1406, asking whether there are any new responsibles, leads to a positive result, appropriate entries for the bulk LUT are generated, and entered, in a step 1407. Furthermore, in step 1408, extract jobs are generated and are placed in the extractor queue EXQ, whose processing initiates the appropriate insert operations.

In a corresponding way, if the answer to the further question 1409, which asks whether ex-responsibles have been defined, is positive, delete orders are generated in a step 1410 and are used to delete the corresponding entries in the bulk LUT. In this case as well, extractor jobs are generated in a step 1411 which, when processed, result in the production of BDocs with delete stamps, which lead to deletion of the corresponding data in the node systems. The step 1412 marks the end of the module.

After the start 1501 of the object subscription checking module illustrated in FIG. 15, an object subscription job generated by the administration station AS is transferred in step 1502, and contains an assignment between corresponding contents of distribution-critical data fields and the relevant responsibles. It thus contains, for example, the statement that representatives 1, 3, 5 and 8 are intended to be responsible for a sales area A, and representatives 2, 4, 6 and 7 are intended to be responsible for a sales area B.

In a subsequent step 1503, the keys for all those BDocs for which these conditions are satisfied are read from the consolidated database CD, that is to say, for example, all the customers who have the entry A in a data field which marks their sales area. Finally, in a step 1504, realignment jobs for all these BDocs are generated and are placed in the realignment queue RAQ, so that they are processed (independently and asynchronously) by the realignment module described with reference to FIGS. 9 to 12. After this, the module ends (1505).

The invention allows a solution, which is particularly advantageous from a number of points of view, to the problems associated with data maintenance in a network of partially replicated database systems. In particular and with good performance it allows the formation and operation of database network systems having a very large number of subscribers (more than 10 000 subscribers) and allows extraordinarily flexible and relatively simple matching to the requirements of the respective database network system operator.

One characteristic element is the interaction of program modules which operate asynchronously and independently of one another, each carry out a defined task, and communicate with one another via defined interfaces. One central function is replication on the basis of lookup tables from which the up-to-date responsibles (at the respective time) for a replication object are read (without taking account of any changes resulting from the change information coded in the replication object), without any processing of data being required. If the change information results in a change in the distribution to the responsibles in the network system, the lookup tables are adapted by means of a realignment process which is carried out asynchronously. Inserts and deletions are likewise transmitted to the relevant responsibles in the course of realignment, once new responsibles and ex-responsibles have been defined.

The invention claimed is:

1. A method for data maintenance in an offline-distributed database network system, the database network system comprising a central system having a central database, and a plurality of node systems having local databases, the local databases capable of containing different subsets of data from the central database, the method comprising:

recording change information relating to data stored in at least one of the central and local databases in the database network system in at least one of the plurality of node systems;

determining which, if any, of said change information relating to data should be replicated into a replication object;

transmitting the a replication object, if an online connection is available, from said at least one of the node systems to the central system or from the central system to said at least one of the node systems; and updating at least one lookup table in accordance with the change information of the replication object, the lookup table identifying local databases requiring updating in response to said change information when an online connection for such local databases becomes available, wherein said at least one lookup table includes a first-type lookup table and a second-type lookup table, the first-type lookup table containing an allocation between types of structure of replication objects and node systems, the second-type lookup table containing an allocation between entities of replication objects and node systems, the node systems being for the replication object in the database network system, determining, in a replication algorithm, node systems for the replication object, and wherein the replication algorithm is carried out by at least one of first and second replication algorithms depending on the type of structure of the replication object, the first replication algorithm being used to allocate a first subset of the replication object to the node systems as a function of the type of structure of the replication object, using the first-type lookup table, and the second replication algorithm being used to allocate a second subset other than the first subset of the replication object to the node systems as a function of an entity of the replication object, using the second-type lookup table.

2. The method according to claim 1, wherein the replication object comprises data sets which are public among the central database and local databases in the database network system.

3. The method according to one of claims 1 or 2, wherein the replication object comprises a type of structure, and a type of database operation corresponding to the change information, the database operation being one of modification, insertion, and deletion.

4. The method according to one of claims 1 or 2, further comprising processing the replication object in the central system in accordance with a flow definition specific for the type of structure of the replication object.

5. The method according to one of claim 1, wherein the change information is transmitted by a remote call such that common data items required for a plurality of calls in an outbound queue are stored only once.

6. The method according to claim 1, wherein said transmitting comprises a plurality of operations, wherein each of said plurality of operations are carried out only if all other operations are carried out.

7. The method according to claim 1, wherein said transmitting comprises using said replication objects to transmit data between platforms and applications of different types.

8. The method according to claim 1, wherein said replication objects contain links to data items of said change information.

9. The method according to claim 1, wherein said transmitting, if an online connection is unavailable, comprises generating a queue of replication objects to be transmitted from said at least one of the node systems to the central system or from the central system to said at least one of the node systems.

10. The method according to claim 1, wherein said updating comprises:

determining up-to-date node systems in accordance with change information included in a replication object;

comparing said up-to-date node systems with current node systems listed in said at least one lookup table to determine additional node systems and out-of-date node systems; and providing information on said additional and out-of-date node systems for update of said at least one lookup table.

11. The method according to claim 10, wherein said updating further comprises:
- initiating, when said additional and out-of-date node systems have been determined, insert operations for the additional node systems and delete operations for the out-of-date node systems;
- transmitting data contents of the replication object to the additional node systems; and
- deleting data contents corresponding to the replication object from the local databases of the out-of-date node systems.

12. The method according to claim 11, wherein the information on said additional and out-of-date node systems is not provided for update of said at least one lookup table until assurance has been obtained that the insert and delete operations have been carried out, before a changed lookup table is accessed for a first time.

13. The method according to one of claim 1, comprising: comparing data in a distribution-critical data field with distribution rules predetermined in a subscription table, and wherein said at least one lookup table is updated on the basis of the comparison.

14. The method according to one of claims 1 or 2, wherein said at least one look-up table for the replication object is updated in accordance with a lookup table for a higher-level replication object.

15. The method according to one of claims 1 or 2, wherein said replication objects are identified by a key assigned uniquely throughout the database network system.

16. The method according to claim 1, wherein said at least one lookup table further includes a plurality of tables of the second-type, each of the plurality of second-type lookup tables containing an allocation between the entities of one of the different types of structure and node systems.

17. The method according to claim 1, wherein the replication algorithm is carried out by a third replication algorithm, the third replication algorithm being used to allocate a third subset other than the first and second subsets of the replication object to the node systems as a function of allocation entered for a higher-level replication object in the second-type lookup table.

18. An article for data maintenance in an offline-distributed database network system, the database network system comprising a central system having a central database, and a plurality of node systems having local databases, the local databases capable of containing different subsets of data from the central database, the article comprising a storage readable medium operable to cause one or more machines to result in operations comprising:
- recording change information relating to data stored in at least one of the central and local databases in the database network system in at least one of the plurality of node systems;
- determining which, if any, of said change information relating to data should be replicated into a replication object;
- transmitting the a replication object, if an online connection is available, from said at least one of the node systems to the central system or from the central system to said at least one of the node systems; and
- updating at least one lookup table in accordance with the change information of the replication object, the lookup table identifying local databases requiring updating in response to said change information when an online connection for such local databases becomes available,
- wherein said at least one lookup table includes a first-type lookup table and a second-type lookup table, the first-type lookup table containing an allocation between types of structure of replication objects and node systems, the second-type lookup table containing an allocation between entities of replication objects and node systems, the node systems being for the replication object in the database network system, determining, in a replication algorithm, node systems for the replication object, and
- wherein the replication algorithm is carried out by at least one of first and second replication algorithms depending on the type of structure of the replication object, the first replication algorithm being used to allocate a first subset of the replication object to the node systems as a function of the type of structure of the replication object, using the first-type lookup table, and the second replication algorithm being used to allocate a second subset other than the first subset of the replication object to the node systems as a function of an entity of the replication object, using the second-type lookup table.

* * * * *